(12) United States Patent
Vyshetsky

(10) Patent No.: US 10,146,279 B2
(45) Date of Patent: Dec. 4, 2018

(54) SOLID STATE MEMORY THERMAL REGULATION

(71) Applicant: Skyera, LLC, San Jose, CA (US)

(72) Inventor: Dmitry Vyshetsky, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 310 days.

(21) Appl. No.: 15/087,548

(22) Filed: Mar. 31, 2016

(65) Prior Publication Data

US 2016/0216749 A1    Jul. 28, 2016

Related U.S. Application Data

(63) Continuation of application No. 13/774,926, filed on Feb. 22, 2013, now Pat. No. 9,317,083.

(51) Int. Cl.
*G05B 15/02* (2006.01)
*G06F 1/20* (2006.01)

(52) U.S. Cl.
CPC ............ *G06F 1/206* (2013.01); *G05B 15/02* (2013.01); *G06F 1/20* (2013.01)

(58) Field of Classification Search
CPC ............ G05B 15/02; G06F 1/20; G06F 1/206
See application file for complete search history.

(56) References Cited

U.S. PATENT DOCUMENTS

| | | |
|---|---|---|
| 6,127,663 A | 10/2000 | Jones |
| 6,487,463 B1 | 11/2002 | Stepp, III |
| 7,050,301 B2 | 5/2006 | Wong et al. |
| 7,126,820 B2 | 10/2006 | Wei |
| 7,345,873 B2 | 3/2008 | Dey et al. |
| 7,403,385 B2 | 7/2008 | Boone et al. |
| 7,593,225 B2 | 9/2009 | Sasagawa et al. |
| 7,742,844 B2 | 6/2010 | Coxe, III |
| 7,848,101 B2 | 12/2010 | Dey et al. |
| 8,040,683 B2 | 10/2011 | Karabatsos |
| 8,234,459 B2 | 7/2012 | Gaither et al. |
| 8,514,571 B2 | 8/2013 | Ji et al. |

(Continued)

OTHER PUBLICATIONS

Non-Final Office Action for U.S. Appl. No. 13/596,979 dated Jul. 15, 2014 (8 pages).

(Continued)

*Primary Examiner* — Yuhui R Pan
(74) *Attorney, Agent, or Firm* — Morgan, Lewis & Bockius LLP

(57) ABSTRACT

A chassis for a storage system contains a digital chamber that houses conventional electronic components and a thermal chamber that houses non-volatile solid state memory such as flash memory. A temperature regulating system monitors temperature within the digital chamber to keep the components therein below their maximum junction temperature. The temperature regulating system tightly regulates the temperature of solid state memory chips to within a nominal operating temperature range selected to extend the lifetime and/or improve the endurance and reliability of the solid state memory. The temperature regulating system may regulate different memory chips to different nominal temperatures based on the operations being performed and lifetime factors for the memory chips including current health and prior use.

20 Claims, 11 Drawing Sheets

(56) References Cited

U.S. PATENT DOCUMENTS

| | | | |
|---|---|---|---|
| 8,514,584 B2 | 8/2013 | Liang et al. | |
| 2002/0056057 A1* | 5/2002 | Co | G01R 31/01 |
| | | | 714/42 |
| 2002/0147564 A1 | 10/2002 | Lamb et al. | |
| 2002/0172008 A1 | 11/2002 | Michael | |
| 2004/0003069 A1 | 1/2004 | Wong | |
| 2005/0002267 A1 | 1/2005 | Daughton et al. | |
| 2008/0002362 A1 | 1/2008 | Ishimine | |
| 2008/0080152 A1 | 4/2008 | Duppong et al. | |
| 2008/0205004 A1* | 8/2008 | Ueno | G11B 33/142 |
| | | | 361/701 |
| 2009/0052266 A1* | 2/2009 | Askar | G06F 13/161 |
| | | | 365/212 |
| 2010/0076728 A1* | 3/2010 | Yanao | G05B 23/0237 |
| | | | 702/183 |
| 2010/0332733 A1 | 12/2010 | Suzuki | |
| 2011/0011844 A1 | 1/2011 | Merrow et al. | |
| 2011/0144825 A1 | 6/2011 | Yamasaki | |
| 2011/0160844 A1 | 6/2011 | Haselby et al. | |
| 2012/0016526 A1* | 1/2012 | Burton | F24F 11/0012 |
| | | | 700/278 |
| 2013/0100627 A1 | 4/2013 | Cong et al. | |
| 2013/0176680 A1 | 7/2013 | Lovicott et al. | |
| 2013/0183913 A1 | 7/2013 | Tevell et al. | |
| 2014/0160844 A1 | 6/2014 | Lin et al. | |

OTHER PUBLICATIONS

Notice of Allowance for U.S. Appl. No. 13/597,051 dated May 22, 2014 (11 pages).

* cited by examiner

SOLID STATE MEMORY THERMAL REGULATION

RELATED APPLICATIONS

This application is a continuation application of U.S. application Ser. No. 13/774,926, filed Feb. 22, 2013,entitled "THERMAL REGULATION FOR SOLID STATE MEMORY," which is expressly incorporated herein by reference in its entirety.

This application is related to U.S. application Ser. No. 13/597,110 entitled "Chassis with Separate Thermal Chamber for Solid State Memory" to Pinchas Herman, et al. filed on Aug. 28, 2012, U.S. application Ser. No. 13/597,051 entitled "Motherboard with Card Guide Cutouts" to Pinchas Herman, et al. filed on Aug. 28, 2012, and to U.S. application Ser. No. 13/596.979 entitled "Integrated Storage and Switching for Memory Systems" to Radoslav Danilak filed on Aug. 28, 2012, the contents of which are each incorporated by reference herein.

BACKGROUND

1. Field of the Invention

The invention relates generally to a chassis for a storage system and more particularly to regulating the temperature of solid state memory within a chassis.

2. Description of the Related Arts

Prices for non-volatile solid state memory such as flash memory have been steadily decreasing while their capacities have been increasing. As a result, solid state drives (SSDs) are becoming an increasingly viable alternative to hard disk drives for storing large quantities of data. Apart from the economic factors, SSDs have several properties that make them preferable over hard disk drives, including reduced power consumption, lower heat generation, faster read/write times, and significantly quieter operation. However, a significant drawback to solid state drives is that they have a finite lifetime, e.g., a limited number of read/write (after erase) cycles that may be performed before failure, known as endurance.

SUMMARY

Throughout the lifetime of a given solid state memory, the ideal operating temperature of the memory may change with duration of on-time, number of recorded read cycles, number of recorded write cycles, total number of read/write cycles, among other factors. Operating the memory at the ideal operating temperature reduces stress on the memory and, hence, extends the lifetime, e.g., by a non-trivial number of read/write cycles. Additionally, operating a collection of memories at their ideal operating temperature may reduce discrepancies in lifetime among the memories.

In order to tightly regulate memory temperature in a storage system, a thermal chamber that houses the memory is configured within the chassis of the storage system. The storage system includes a cooling system configured to extract heat from the memory. Meanwhile, the storage system includes a heating system configured to input heat into the memory. A temperature regulating system selectively modulates heating elements of the heating system and cooling elements of the cooling system to regulate the temperature of the memory within the thermal chamber. For example, the temperature regulation system may regulate the operating temperature of the memory to a preferred operating temperature (e.g., 15° C., 25° C., 40° C., 70° C., 85° C.) that extends the lifetime (e.g., the number of read/write cycles) of the memory. Additionally, embodiments the storage system may include multiple independent thermal chambers that are regulated to different preferred operating temperatures.

In some configurations, the healing system includes a number of heating elements disposed on a memory blade, which itself includes a number of memory chips. The heating elements most effectively input heat into proximate, or nearby, memory chips on the memory blade. In turn, the temperature regulating system may selectively modulate a given heating element in the plurality of heating elements on the memory blade to regulate the temperature of nearby memory chips.

In mass storage configurations, the thermal chamber may house numerous individual memory blades and the temperature regulation system selectively modulates the heating elements of a given memory blade to regulate the temperature of the memory chips thereon. Accordingly, the temperature regulating system may selectively modulate the heating elements across the plurality of memory blades to regulate heat input into the memory chips within the thermal chamber.

In some configurations, the cooling system includes a number of cooling elements (e.g., multiple fans coupled to the thermal chamber) that extract heat most effectively from a given set of nearby memory chips (or memory blades). Accordingly, the temperature regulating system may selective modulate a given cooling element in the plurality of cooling elements to regulate the temperature of nearby memory chips (or memory blades).

In mass storage configurations, the thermal chamber may house numerous individual memory blades and the temperature regulation system selectively modulates the cooling elements most effective in cooling a memory blade or set of memory blades to regulate the temperature of the memory chips thereon. Accordingly, the temperature regulating system may selectively modulate the cooling elements across the plurality of memory blades to regulate heat extraction from the memory chips within the thermal chamber.

The temperature regulating system coordinates the modulation of the various heating elements and cooling elements affecting each memory blade (and memories thereon) within the thermal chamber to tightly regulate memory chip temperature within a given ideal operating temperature range (e.g., within 3° of a preferred operating temperature). The temperature regulating system may additionally modulate the various heating and cooling elements to account for thermal contribution of the memories themselves due to changes in functional activity levels.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments described herein can be readily understood by considering the following detailed description in conjunction with the accompanying drawings.

DETAILED DESCRIPTION OF EMBODIMENTS

Figure 1A:
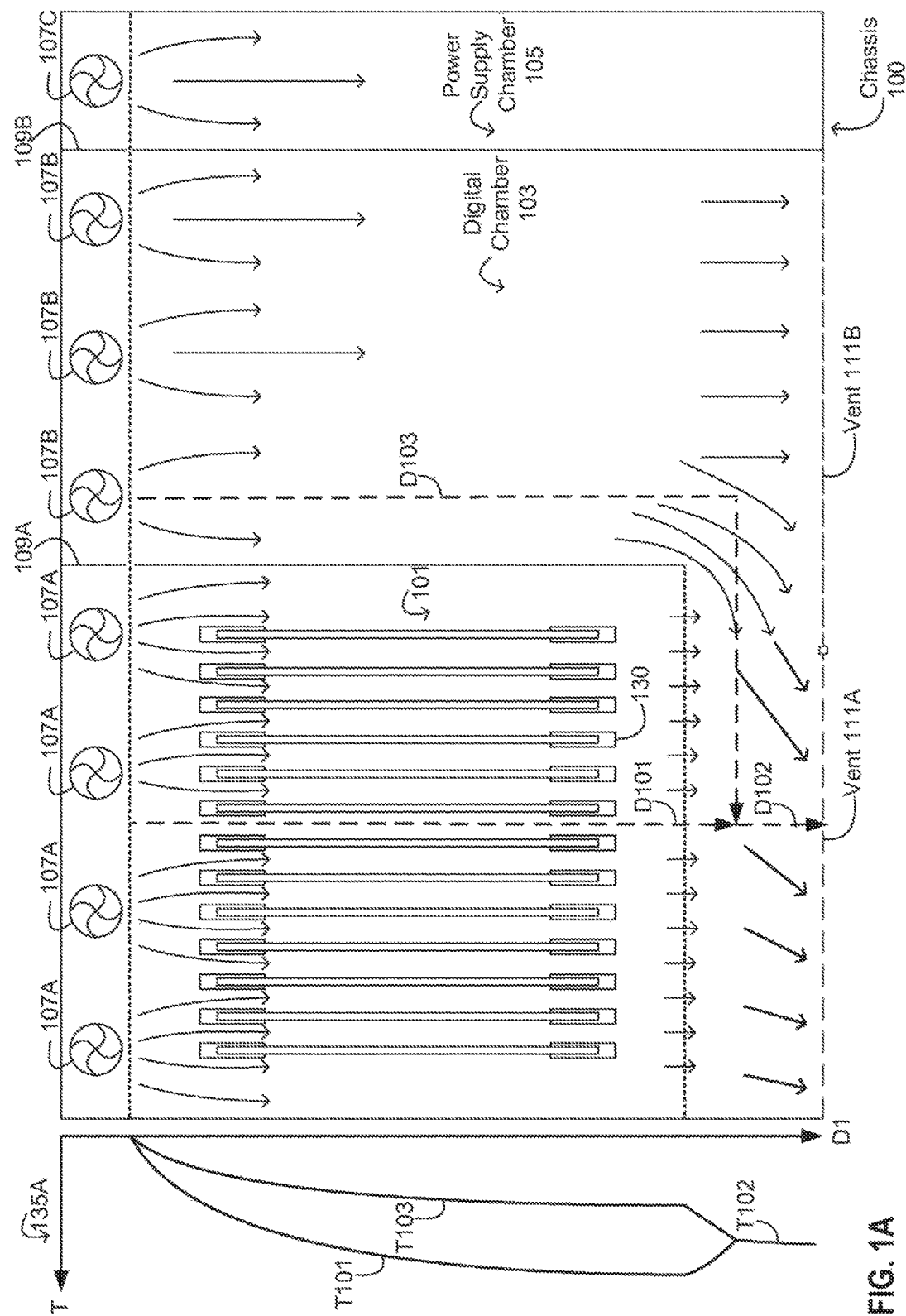
FIG. 1A is a top-down view of a storage system including a chassis with multiple thermal chambers, according to one embodiment.

The teachings of the embodiments of the present invention can be readily understood by considering the following detailed description in conjunction with the accompanying drawings.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Reference to this particular hardware is for exemplary purposes only and the scope of the invention is not limited to this particular component.

As used herein, the term "substantially" or "approximately" as applied to metrics such as length, area, volume, form factor, orientation (e.g., perpendicular or parallel), etc. means that the metric does not necessarily precisely conform to the state value, but rather the metric may vary within a reasonable range to achieve substantial conformance as will be understood to those of ordinary skill in the art.

Furthermore, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

A chassis for a storage system includes thermal chambers for housing digital components, a power supply, etc., and a separate, tightly regulated, chamber for housing non-volatile solid state memory such as flash memory. In some configurations, multiple thermal chambers may be used to partition a group of memory chips into smaller subsets. The separate thermal chambers enable the system to maintain the electronic components and the solid state memory at different temperatures. While traditional chassis are designed to dissipate heat from the internal electronics to maintain the electronics below a maximum junction temperature, the chassis described herein is instead designed to maintain the solid state memory devices within a narrow range of a preferred operating temperature. As a result, the solid state memory devices may be at a significantly different temperature than the supporting digital electronics and power supply. For example, in one embodiment, the thermal chamber housing the solid state memory devices maintains the memory devices within 3° C. of a preferred operating temperature of, for example, 25° C. or 70° C., while the thermal chamber housing the supporting digital components maintains the digital components below a maximum junction temperature of 125° C. As a result, the thermal chamber housing the solid state memory (and memory devices therein) may be significantly warmer than the supporting digital electronics when the electronics are near room temperature (e.g., when idle) and significantly cooler when the electronics are near their maximum junction temperature (e.g., at full load).

Maintaining the solid state memory in a narrower temperature range (i.e., preventing large fluctuations in temperature) has been observed to significantly reduce the error bit rate of solid state memory, thus improving endurance and reliability. Different preferred operating temperatures may be selected to enhance the reliability and performance of solid state memory in different situations. For example, in situations where data is typically modified at a high data rate, it may be beneficial to maintain the solid state memory at a higher temperature (e.g., 70° C.) to improve endurance and reliability. In other situations, maintaining flash memory at a lower temperature (e.g., 25° C. or lower) may reduce the rate of data decay in the memory, which can be beneficial in a scenario where data in the memory is typically accessed at a high bit rate but modified at a lower bit rate.

Additionally, as memory ages, the ideal operating temperature for a given operating condition may change. For example, in situations where data is typically modified at a high data rate, it may be beneficial to maintain the solid state memory at 40° C. rather than 70° C. (or any temperature) after a given number of read/writes or on-time of the memory to improve endurance and reliability. In other situations, where data in the memory is typically accessed at a high bit rate but modified at a lower bit rate, it may be beneficial to maintain the solid state memory at 15° C. rather than 25° C. (or any other temperature) after a given number of read/writes or on-time of the memory to improve endurance and reliability.

By controlling memory temperature appropriately, the endurance and reliability of the solid state memory may be extended under a variety of operating conditions. For example, the number of read/write cycles may substantially increase and the memory failure rate or error rate in read/written data may be decreased. Thus, the described chassis includes a temperature regulating system that provides dual zone temperature control that allows both the digital electronics and the memory to operate under their respective ideal temperature conditions. In addition, the temperature regulating system accounts for variance in temperature (e.g., due to location, activity, etc.) among individual (or groups) of memories within the thermal chamber housing the memory to tightly regulate all memories to their ideal operating temperature.

FIG. 1A is a top-down view of a storage system including a chassis 100 with multiple thermal chambers, according to one embodiment. The chassis 100 also includes a temperature regulating system (not shown) that may be implemented using one or more digital signal processing (DSP) blocks (not shown) that provide filters (e.g., high-pass, low-pass, band-pass) for monitoring sensor readings. The DSP blocks may also include logic for regulating the temperatures within a thermal chamber in response to the readings. Embodiments may also utilize a processor (e.g., that of the storage system or separate) coupled to the DSP blocks and configured to monitor DSP block operations and outputs which effect heating and/or cooling within a thermal chamber. In turn, the processing unit may overwrite DSP outputs or modify operations (e.g., to set a particular operating temperature range, etc.) as needed throughout the system lifetime. In one embodiment, the DSP blocks and/or processor interface with system firmware to effect heating and/or cooling.

A digital chamber 103 holds electronic components mounted on a motherboard (e.g., a printed circuit board (PCB)). These electronic components may include, for example, one or more processors and/or controllers, random access memory (RAM), and network interface devices. Some of the components (e.g., a processor or other high power components) may be positioned under heat sinks that help dissipate the heat generated by these components.

The temperatures of the components in the digital chamber 103 can rise when the components are under heavy load, which can lead to failure of The devices when not regulated. Thus, to prevent the electronics with the digital chamber 103 from overheating, a cooling system comprising a set of fans 107B generates air flow through the digital chamber 103 to provide cooling sufficient to maintain the components below their maximum junction temperature. Electronic components typically have a maximum junction temperature of around 125° C., but some components may have a maximum junction temperature that is higher (e.g., 150° C.) or lower (e.g., 85° C., 105° C.). Generally, it is desirable to dissipate heat from these electronic components as much as possible. Thus, in a typical embodiment, the temperature regulating system is configured to adjust fan 107B speed to keep the temperature of the components in the digital chamber 103 below their maximum junction temperature. A number of temperature sensors (not shown) positioned within the digital chamber 103 and/or in contact with electronic components in the chamber may report ambient air, PCB and/or junction temperatures to the temperature regulating system. In turn, the temperature regulating system may increase or decrease fan 107B speed as necessary to regulate temperature.

A memory chamber 101 includes solid state memory for storing data. As shown in FIG. 1A, the memory chamber 101 includes an array of memory blades 130 mounted substantially perpendicular to the motherboard. Each memory blade may include, for example, a PCB having one or more memory controllers for managing the storage of data within solid state memory chips mounted on the memory blade. Similar to the digital chamber 103, the memory chamber 101 may include a cooling system comprising a set of fans 107A to generate air flow through the memory chamber 101 in order to prevent the temperature of the memory chips from exceeding a maximum temperature. A number of temperature sensors (not shown), such as the SE97BTP,547 or MAX6699EE99+T, positioned within the memory chamber 101 and/or in contact with memory blades 130 and/or memory chips in the chamber may report memory chamber 101 air. PCB, memory chips and/or junction temperatures to the temperature regulation system. The temperature regulation system may, in turn, increase or decrease fan 107A speed as necessary to regulate temperature. To prevent the digital chamber 103 from affecting the temperature of the memory chamber 101, an air barrier 109A may be included in the chassis 100 to separate the two chambers 101, 103.

A power supply chamber 105 holds a power supply that provides power to the electronic components in the digital chamber 103 and to the memory blades 130 in the memory chamber 101. In a typical embodiment, the components in the digital chamber 103 generate more heat than the power supply, so the air in the digital chamber 103 is likely to be at a higher temperature than the air in the power supply chamber 105. To prevent the digital chamber 103 from raising the temperature of the power supply chamber 105 (the power supply components therein being sensitive to high operating temperatures), an air barrier 109B may be included in the chassis 100 to separate the two chambers 103, 105. Similar to the other chambers 101, 103, the power supply chamber 105 may include a fan (or set of fans) 107C to generate air flow through the memory chamber 101 in order to prevent the temperature of the power supply from exceeding a maximum junction temperature.

The chassis 100 includes a rear panel (reference numeral omitted) that includes vents or perforations that allow the fans 107 to pull in outside air into the chassis 100 and a front panel with vents 111 that allow moving air to exit the chassis 100. The rear panel may also have a plurality of ports (e.g., Ethernet ports) to interface the storage system to one or more external devices (e.g., a network server). In other embodiments, the front panel, or other portions of the chassis 100. may include all or a portion of the ports.

As a whole, the storage system can be used for a wide range of computing tasks. However, the storage system is particularly useful as a high-speed networked storage system that provides connected computing devices with access to data stored in the memory. For example, in one embodiment, the storage system can provide 50 terabytes or more of high speed solid state memory in a single chassis 100. In the embodiment shown in FIG. 1, the storage system is housed in a chassis 100 with 1U (one rack-unit) form factor. Thus, the chassis 100 has a substantially flat shape that allows it to be installed in a rack with other equipment (e.g., servers) that can be directly connected to the storage system to access the stored data.

In one embodiment, the temperature regulating system of the storage system controls the temperature within the memory chamber 101 to tightly regulate the temperature of the memory blades 130 and memories mounted thereon. For example, the temperature regulating system may keep the memory modules on the memory blades 130 within 3° C. of a preferred operating temperature of 70° C. (e.g., between 67° C. and 73° C.) or at a substantially lower operating temperature, such as 40° C., 25° C. or 15° C., or other desired value. As described above, a lower operating temperature may be beneficial for a scenario where the data in the memory modules is accessed at a high bit rate but is modified at a lower bit rate. In addition, a different preferred operating temperature (e.g., 40° C., or 85° C.) or a different temperature range (e.g., within 1° C., 2° C., or 5° C. of the preferred operating temperature) may be used. Consequently, it may be beneficial to regulate the memory chamber 101 to a temperature substantially different than the digital chamber 103. As a result, the air barrier 109A separates the memory chamber 101 and the digital chamber 103.

However, in some embodiments, the memory chamber 101 exhausts air into the digital chamber 103, which may increase the temperature of some digital components (i.e., those in the path D102 of the exhaust). In the embodiment shown in FIG. 1A, the digital chamber 103 has a six-sided L shape with a narrower rear inlet section mid a wider front venting 111 section. The air passes through the rear section and a portion of the air turns into the leg of the L shape and exits through the vents 111 in the wider front section as indicated by the arrows.

As shown in FIG. 1A, the front panel include two sets of vents 111A, 111B for the digital chamber 103. The airflow through each set of vents 111 may be adjusted to counteract increases in temperature between the two sections of the L shaped digital chamber 103. Specifically, the vents 111B receiving the most direct airflow from the fans 107B cooling the digital chamber 103 may restrict airflow compared to the vents 111A exhausting air from the memory chamber 101. The restriction of airflow from vents 111B redirects some airflow from fans 107B through the leg of the L shaped digital chamber 103 and over the digital components in the path D102 of the memory chamber 101 exhaust. Depending on the embodiment, the vents 111A, 111B may be manually adjusted or automatically adjusted (e.g., using one or more actuators coupled to the vents 111A, 111B) by the temperature regulating system. In addition to vents 111, the power supply chamber 105 may include a vent (not shown) for exhausting air cooling the power supply.

Graph 135A illustrates example temperature readings T101, T102, and T103 along paths D101, D102, and D103, respectively, at a given longitudinal distance D1 through the chassis 100. As air from the fans 107A is pushed through the memory chamber 101 along path D101, the air heats up. Consequently, the temperature T101 of exhaust air from the memory chamber 101 is hotter than the input air. Similarly, the input air in the digital chamber 103 from fans 107B heats up as it travels along path D103. Additionally, as described above, some components (e.g., along path D102) receive both exhaust air from the digital chamber 103 and the memory chamber 102.

As shown in graph 135A, for example, in embodiments where the memory chamber 103 is regulated to a temperature T101 greater than the temperature T103 of the digital chamber 103, components in the path D102 of exhaust from the memory chamber 101 may have a temperature T102 exceeding the maximum temperature T103 of components along path D103. In an alternative example (not shown), when the memory chamber 101 is regulated to a temperature T101 lower than the temperature T103 of the digital chamber 103, components along path D103 may have a temperature T103 exceeding that of components along path D102. Accordingly, the temperature regulating system may ensure, by controlling fans 107B, that temperature T103 does not exceed a desired level.

Additionally, in some embodiments, the temperature regulating system may close and/or open vents 111A, 111B to adjust whether more or less air from fans 107B flows over components in the path D102 of the memory chamber 101 exhaust to regulate temperature T102.

Figure 1B:
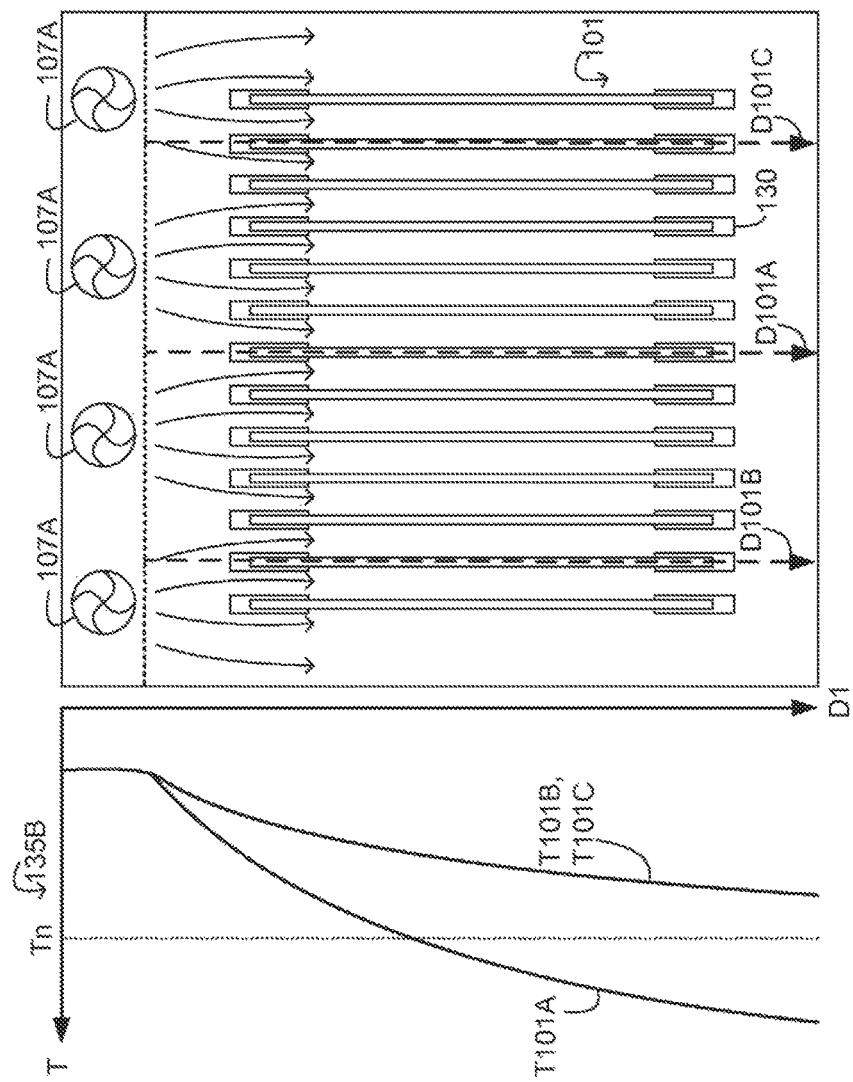
FIGS. 1B-D illustrate a top-down view of a thermal chamber and example unregulated thermal gradients within the thermal chamber, according to one embodiment.

FIG. 1B illustrates a top-down view of a thermal chamber 101 and example unregulated thermal gradients T101 within the thermal chamber, according to one embodiment. As described above, the temperature at a given longitudinal distance D1 increases clue to input, air from the fans 107A extracting heat from components, such as memory blades 130, and heating up. Consequently, for a given blade 130 in the memory chamber 101, memory chips positioned closer to the fans 107A (e.g., receiving the input air) run cooler than those further away. Graph 135B illustrates that example temperature readings T101A, T101B, and T101C along paths D101A, D101B, and D101C, respectively, increase with distance D1.

Consider temperature T101A measured along path D101A through a memory blade 130. Moving along the thermal gradient T101A, the memory chips closest to the fans 107A may operate at temperatures below a desired nominal operating temperature Tn while the memory chips furthest away from the fans 107A may operate at temperatures greater than the desired nominal operating temperature. These extremes often fall outside the desired regulation range, e.g., +/−3° C., causing a reduction in memory lifetime.

Furthermore, consider thermal gradients T101B and T101C along paths D101B and D101C, respectively, through memory blades 130 at the edges of the array of memory blades 130. While memory blades 130 in the middle of the array, such as the memory blade 130 along path D101A, are surrounded by heat generating components (other memory blades), memory blades at the edges of the array are not and thus, may run at lower operating temperatures. For example, as illustrated in graph 135A, thermal gradients T101B and T101C of memory blades 130 at the edges of the array stay below the thermal gradient T101A along path D101A. Consequently, when the thermal gradient T101A of memory blades 130 at the center of the array is regulated the desired nominal operating temperature Tn, memory blades along the edges may operate at temperatures greater than the desired nominal operating temperature. These extremes often fall outside the desired regulation range, e.g., +/−3° C., causing a reduction in memory lifetime.

Figure 1C:
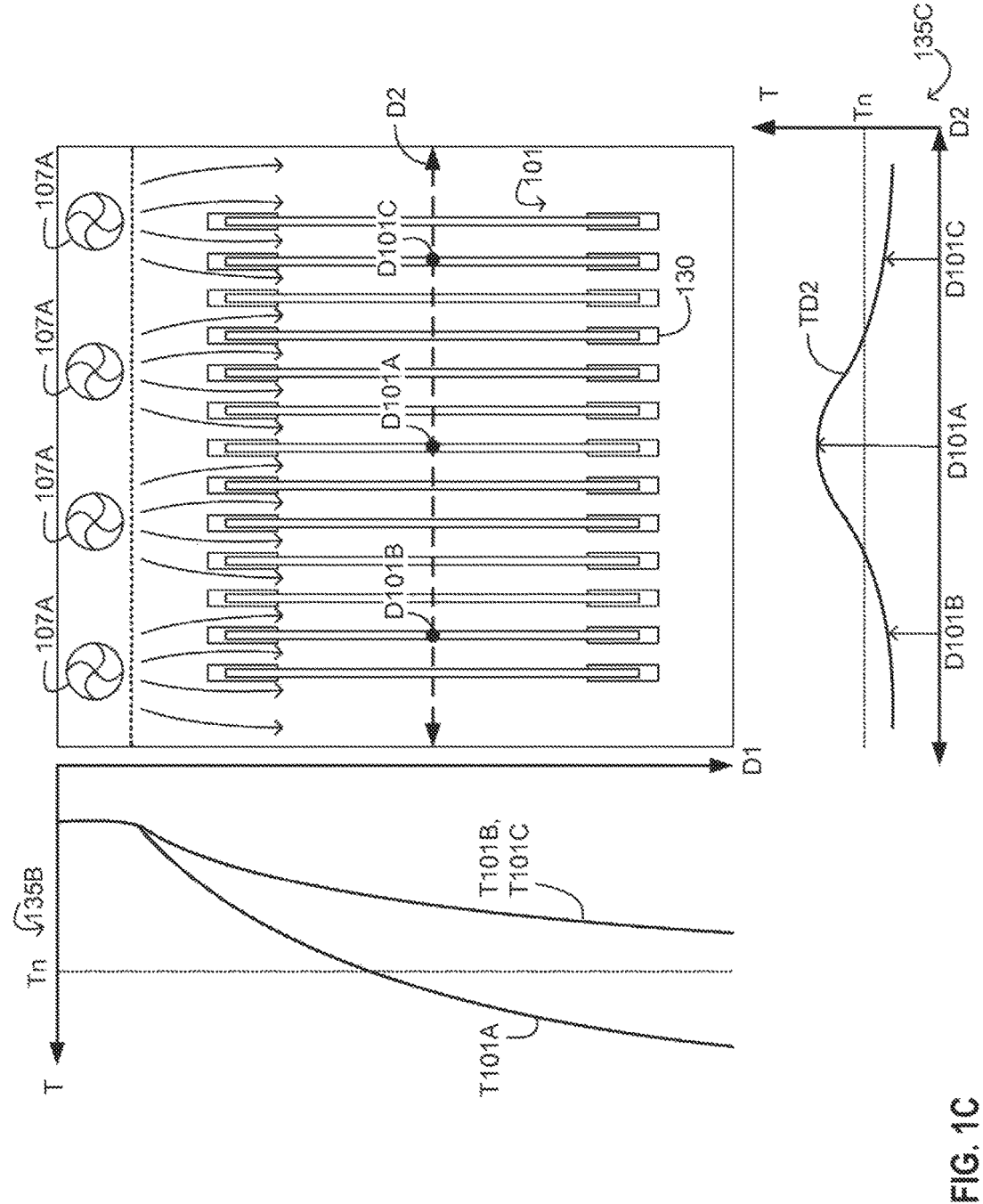

FIG. 1C illustrates a top-down view of a thermal chamber 101 and example unregulated thermal gradients T101, TD2 within the thermal chamber, according to one embodiment. As described above, the temperature at a given longitudinal distance D1 increases due to input air from the fans 107A extracting heat from components, such as memory blades 130, and heating up. Furthermore, memory blades 130 at the edges of the array, which are not surrounded by other components may operate at cooler temperatures than memory blades in the middle of the array.

Graph 135C illustrates an example thermal gradient TD2 moving along a horizontal path D2 perpendicular to the memory blades 130 and direction of air flow from fans 107A. As shown, the thermal gradient TD2 increases in the center (D101A) of the array and decreases at the edges (D101B, D101C) of the array along path D2. Consequently, the operating temperature of a given memory blade 130 (and memory chips thereon) may deviate from the nominal operating temperature Tn based on horizontal position (in addition to longitudinal position as shown in graph 135B) within the array.

Figure 1D:
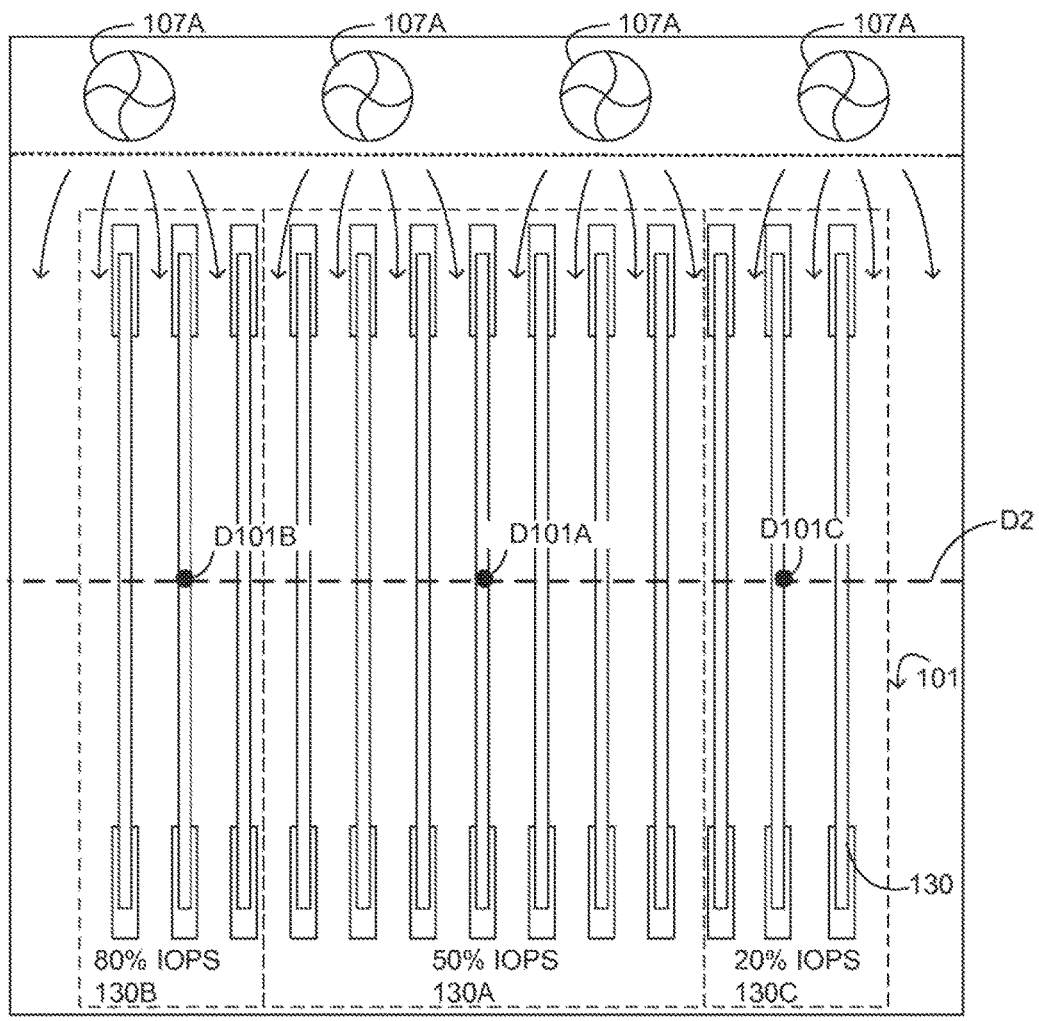
Figure 1D:
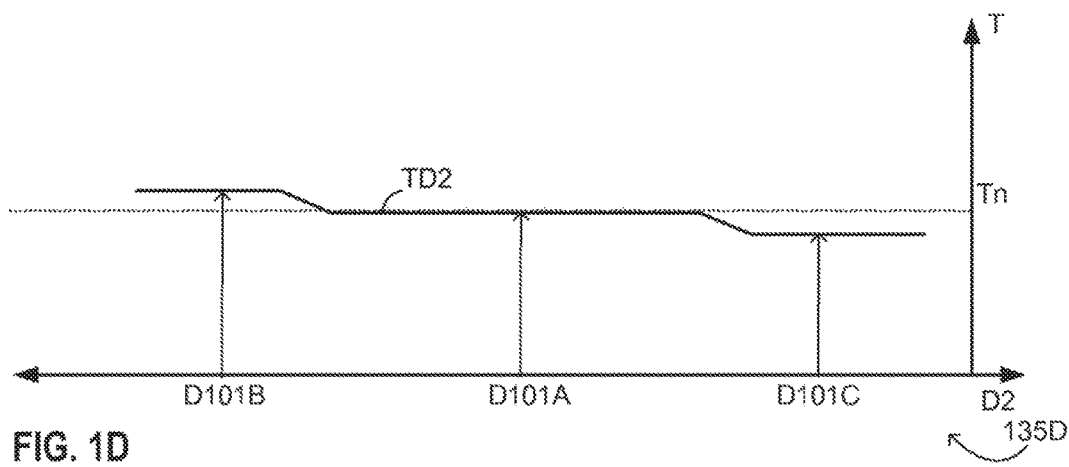

FIG. 1D illustrates a top-down view of a thermal chamber 101 and example unregulated thermal gradient TD2 within the thermal chamber, according to one embodiment. In addition to temperature variances between different positions within the thermal chamber, varying levels of activity among memory blades 130 can cause a thermal gradient. For example, as illustrated in FIG. 1D, there are three groups of memory blades 130A, 130B, 130C having differing levels of activity. Specifically, as the level of activity of a memory blade 130 represented by the number of Input/Output Operations Per Second (IOPS) increases, power consumption of the memory blade increases and thus, temperature increases. For example, as shown, memory blades 130A may perform at 50 percent of their maximum IOPS, memory blades 130B at 80% IOPS and memory blades 130C at 20% for a given time period (e.g., on the order of second to hours). While the memory blades 130 activity levels are oftentimes independent, groupings of memory blades 130A, 130B, 130C are shown for illustrative purposes.

Graph 135D illustrates an example thermal gradient TD2 moving along a horizontal path D2 perpendicular to the memory blades 130. The IOPS of the memory blades 130 decreases from left to right along path D2 and thus, the thermal gradient TD2 decreases proportionally from left to right as well.

Specifically, memory blade grouping 130A operating at 50% of the maximum IOPS has a median temperature TD2 value at D101A along path D2. These memory blades 130A are shown, as an example, at the nominal operating temperature Tn.

Meanwhile, memory blade grouping 130B operating at 80% of the maximum IOPS has the highest temperature TD2 value at D101B along path D2 and operates above the nominal operating temperature Tn. In turn, memory blade grouping 130C operating at 20% of the maximum IOPS has the lowest temperature TD2 value at D101C along path D2 and operates below the nominal operating temperature Tn.

Consider the above example where the temperature in chamber 101 is regulated such that the thermal gradient TD2 of memory blades 130A operating at 50% IOPS is held at the nominal operating temperature Tn. As long as a memory bade 130 doesn't exceed or drop below 50% IOPS for a significant period of time (e.g., 1 to 10 seconds), the memory blade may stay within the desired regulation range, e.g., +/−3° C. of Tn. However, if the desired regulation range decreases (tighter regulation), shorter durations of activity and lower levels of IOPS deviation from 50% of the maximum would need to be maintained. In a typical mass storage scenario, restricting/maintaining IOPS to a specific level is neither efficient nor feasible when data must be delivered quickly to/from a memory blade 130. Consequently, the operating temperature of a given memory blade 130 (and memory chips thereon) may deviate from the nominal operating temperature Tn based on the level of activity compared other memory blades 130 within the array.

Figure 2:
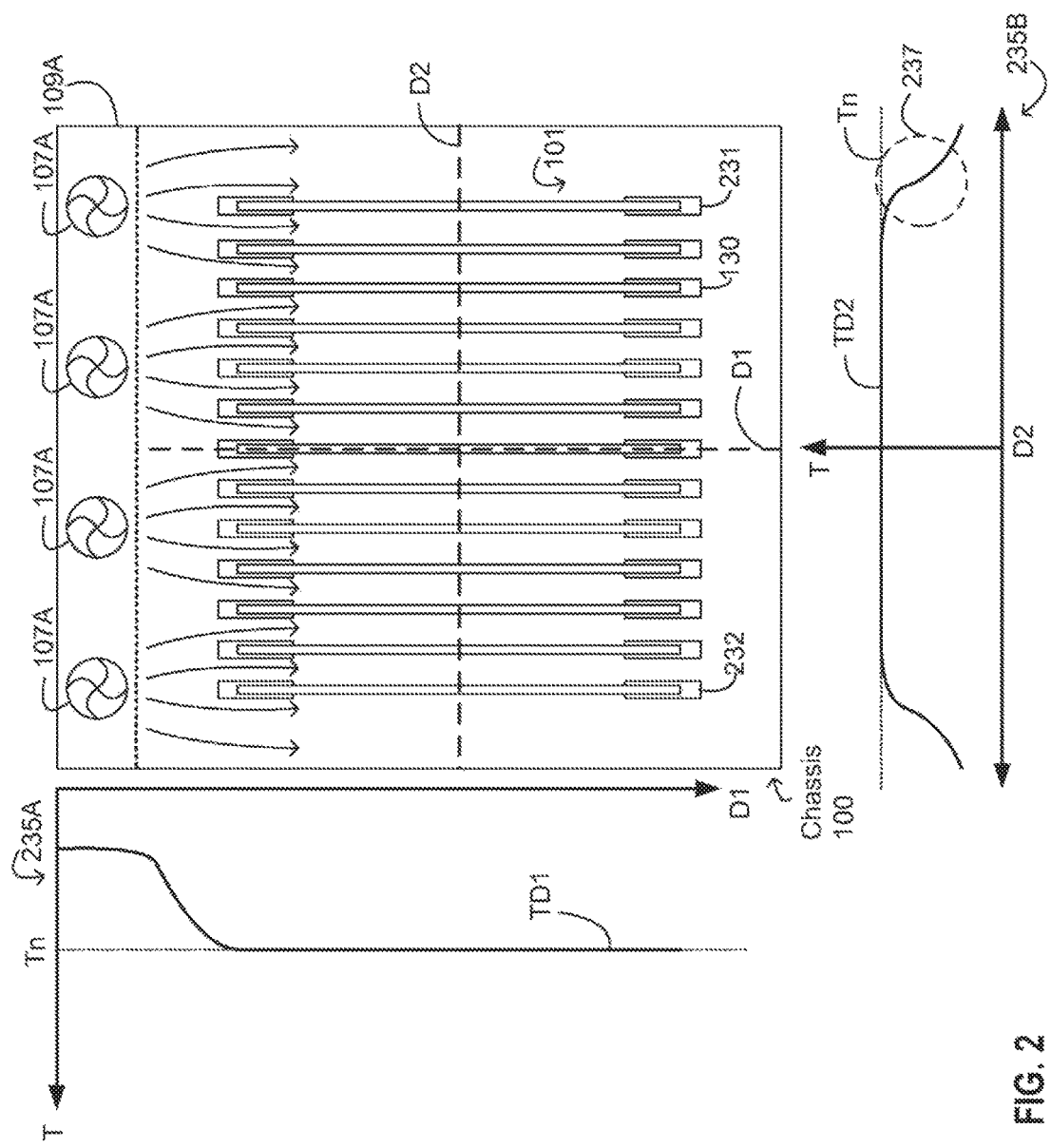
FIG. 2 illustrates a top-down view of a thermal chamber and example regulated thermal gradients within the thermal chamber, according to one embodiment.

FIG. 2 illustrates a top-down view of a thermal chamber and example regulated thermal gradients TD1, TD2 within the thermal chamber 101, according to one embodiment. As described above, the temperature of a given memory blade 130 and the memory chips thereon may vary based on one or more of longitudinal position (e.g., distance from fans 107A), horizontal position (e.g., proximity to other memory blades 130 and components), and the level of activity, or IOPS, being performed by the memory blade 130 and/or a memory chip thereon. The temperature regulating system mitigates these variations to tightly regulate the longitudinal thermal gradients through the array to the nominal operating temperate of the memory blades 130.

Graph 235A illustrates an example regulated thermal gradient TD1 along longitudinal path D1 through a memory blade 130 in the array. The temperature regulating system regulates thermal gradient TD1 of the memory blades 130 to the nominal operating temperature Tn regardless of distance from the fans 107A.

Graph 235B, in turn, illustrates an example regulated thermal gradient TD2 along horizontal path D2 through the memory blades 130 in the array. The temperature regulating system regulates thermal gradient TD2 of the memory blades 130 to the nominal operating temperature Tn regardless of their position within the array. Additionally, the temperature regulating system regulates thermal gradient TD2 of the memory blades 130 to the nominal operating temperature Tn regardless of activity level, or IOPS being performed.

In one embodiment, the thermal chamber 101 is constructed such that the area between memory blades 231, 232 at the edge of the array and air barriers (e.g., 109A) and/or edges of the chassis (e.g., 100) is minimized. Minimizing these areas increases air resistance at the edges of the array near the air barrier 109A and edge of the chassis 100. Thus, air flow increases over memory blades 130 in the interior of the array while air temperature at the edges of the array rises. The rise in air temperature (e.g., to a level similar to that of the interior of the array) minimizes drop-off 237 in thermal gradient TD2 experienced by memory blades 231, 232 at the edge of the array.

Figure 3A:
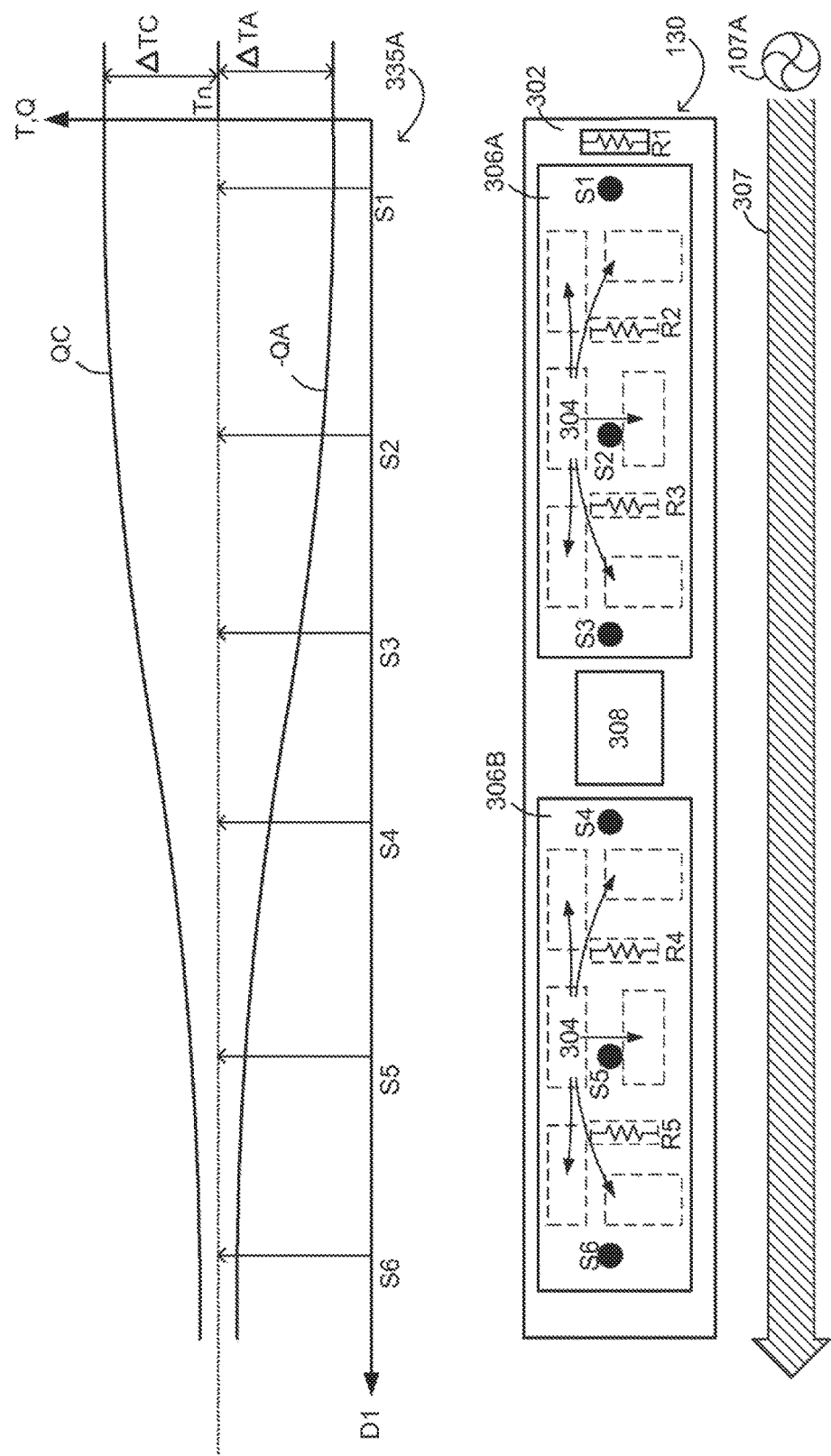
FIG. 3A-B illustrate a right-side view of a memory blade within a thermal chamber and thermal regulation thereof, according to one embodiment.

FIG. 3A illustrates a right-side view of a memory blade 130 within a thermal chamber 101 and thermal regulation thereof, according to one embodiment. The memory blade 130 comprises a printed circuit board (PCB) 302 having a plurality of mounted components. A plurality of memory chips 304 are mounted to the PCB 302 and covered with heat spreaders 306. In some embodiments, the opposite side of the memory blade 130 may include additional heat spreaders and clusters of memory chips. In some embodiments, the heat spreaders 306 function as heat syncs to conduct heat from memory chips to the airflow 207.

Each heat spreader 306A, 306B comprises a piece of thermally conductive material (e.g., copper, aluminum, or an alloy of multiple elements) that is thermally coupled to clusters of memory chips 304. The heat spreader 306A, 306B provides a heat conduction path between the memory chips 304 and allows each cluster of chips 304 to be maintained at approximately the same temperature. The interior surface of the heat spreader 306A, 306B may directly contact the memory chips 304, or a thermal paste or tape may be placed between the chips 304 and the internal surface to enhance the heat transfer between the chips 304 and the heat, spreader 306A, 306B. The exterior surface of the heal spreaders 306A, 306B may have ridges to increase the heat spreader's external surface area and improve heat transfer between the heat spreader 306A, 306B and the airflow 307 from fans 107A.

The memory blade 130 may also include a controller 308 for the memory chips 304. The controller 308 manages data stored on the memory chips 304 (e.g., read, write, or erase operations) and transfers data between the chips 304 and electronic components in the digital chamber 103. Additionally, the controller 308 may retain operational history data and test patterns for memory chips. Operation history data may include information such as age (e.g., total runtime) and/or total cycles (e.g., number of read/write operations) of memory chips used in lifetime analysis. The controller 308 may run a test pattern to determine current health (e.g., charge storage ability, read current, read errors, etc.) of memory chips.

In embodiments where the memory blade 130 contains memory chips 304 on both sides, a second controller (not shown) may be added to the opposite side to manage the data stored on the chips (not shown) on the opposite site. Alternatively, a single controller 308 may manage the data stored on. the memory chips 304 on both sides of the memory blade 130.

The memory blade 130 may also include heating elements R. The temperature regulating system can use the heating elements R to rapidly raise the temperature, if accessory, of the memory chips 304 to their preferred operating temperature (e.g., 25° C. or 70° C.) after the storage system is booted up. Additionally, the heating elements R can also be used to maintain the memory chips 304 at their preferred operating temperature Tn during times of low activity or when the temperature of a memory chip in the thermal chamber 101 otherwise drops below its preferred operating temperature Tn. Further, the heating elements R can also be used to mitigate the differences in heat (Q) extracted from the memory chips 302 by airflow 307 along path D1 through the memory array. In the embodiment illustrated in FIG. 3A, the heating elements R1-5 are resistive heaters that generate heat when an electric current is passed through them, although other types of heating devices may be used. For example, a heating element R may generate heat proportional to a received current controlled by the temperature regulating system.

In the illustrated embodiment, the heating elements R are mounted to the PCB 302 of the memory blade 130. The heating elements R may be coupled through thermal vias to a thermal layer (e.g., a copper ground layer or a dedicated heat conductive layer) of the PCB 302 of the memory blade 130. This, in turn, causes the temperature of the PCB 302 to increase and heat the memory chips 304 proximate to the heating element R. In some embodiments, the memory chips 304 may be coupled to the thermal layer of the PCB 302 through thermal vias as well.

Alternatively, or in addition to thermal via coupling, heating elements R may be coupled to a heat spreader 306 to facilitate heat transfer to memory chips 304 coupled to the same heat spreader. This, in turn, causes the temperature of the heat spreader 306 to increase and heat the memory chips 304 coupled to the heat spreader 306.

The memory blade 130 further includes temperature sensor elements S to provide feedback to the temperature regulating system. The temperature sensors S monitor the temperature of the memory chips 304 (e.g., with a thermal sensor). The sensors S may monitor the temperature of a memory chip(s) through a direct thermal coupling with memory chips, proximity with memory chips, e.g., coupled to the heat spreader 306 and/or the thermal layer, or other means. For example, a sensor S may be incorporated within a memory chip 304 itself or a sensor S may measure air temperature in the chamber 101 proximate to one or more memory chips 304, the measured air temperature serving as a proxy for the temperature of the memory chips 304. In another example, the PCB 302 may incorporate a thermal sensor where a memory chip 304 mounts to the PCB and, optionally, where the memory chip 304 is coupled to the thermal layer. The temperature sensors S may provide the temperature feedback (e.g., to the controller 308 or the temperature regulating system) via a digital or analog link.

In some embodiments, the memory blade 130 may also include cooling elements (not shown). The cooling elements may be used in conjunction with the fans 107 to lower the temperature of the chips 304 when the temperature of the chips 304 exceeds the preferred operating range. The cooling elements may be used to perform cooling functions that would be difficult or impossible for the fans 107 to perform, such as cooling specific groups or individual memory chips 304 or cooling the chips to a temperature lower than the ambient temperature surrounding the chassis 100 (e.g., 15° C.). In one embodiment, the cooling elements are thermoelectric cooling devices (e.g., Peltier elements) that transfer heat when an electric current is applied. Alternatively, the cooling elements may be pans of a reverse Rankine cycle (e.g., a refrigeration system) or some other active cooling system. Similar to the heating elements, the cooling elements such as Peltier elements can be mounted on the PCB 302 (e.g., coupled through vias to the thermal layer), heat spreader 130 or, alternatively, couplings with a memory blade 130 may be achieved through heat pipes or other means.

FIG. 3A also illustrates a graph 335A showing heat transfer Q of a memory blade 130 regulated to the desired nominal operating temperature Tn for the memory chips 304. As shown, the sensors S1-6 provide readings which are compared to the nominal operating temperature Tn of the memory chips 304. In order to regulate the overall temperature of the memory chips 304, heat addition (positive Q) and removal (negative Q) to the memory chips 304 must be balanced around the nominal operating temperature Tn such that temperature fluctuations ($\Delta TC$ and $\Delta TA$, respectively) from the nominal temperature Tn are minimized. Hence, the temperature regulating system regulates the addition of heat QC and removal of heat $-QA$ from the memory chips 304 to maintain the memory chips 304 at the nominal operating temperature Tn based on feedback from the sensors S1-6.

As the fans 107A force air 307 through the thermal chamber 101, the heat spreaders 306 remove heat ($-QA$) from the memory chips 304 and, in turn, heat up the air. As the air 307 increases in temperature while flowing through the thermal chamber 101, the heat spreaders 306 remove less heat from the memory chips. As shown in the graph 335A, heat removal, $-QA$, from the memory blade 130 decreases as the temperature of the air 307 increases. In some embodiments, heat removal $-QA$ from the memory blade 130 may result from cooling elements other than, or in addition to fans 107A.

If the temperature regulating system receives feedback from a sensor S indicating that a memory chip 304 exceeds the desired nominal temperature Tn, the temperature regulating system may increase heat removal $-QA$ from the memory chip 304 by increasing fan 107A speed or via another cooling element. In instances where a given cooling element most directly affects the overheating memory chip 304, the temperature regulating system may increase heat removal $-QA$ using that specific cooling element rather titan for the whole memory blade 130 or memory array. The opposite may be performed when the sensor S indicates that the memory chip 304 falls below the desired nominal temperature Tn.

At the same time, components on the memory blade 130 such as memory chips 304, controller 308. and resistive elements R1-6 heat (QC) the memory chips 304 and, in turn, counteract the removal of heat ($-QA$) from the cooling elements. As the air 307 increases in temperature while flowing through the thermal chamber 101, the input heat (QC) required to counteract the cooling effect decreases. Conversely, a greater amount of input heat QC is required initially when cooler air 307 flows over of the memory blade 130. Accordingly, if the temperature regulating system receives feedback from a sensor S indicating that a memory chip 304 falls below the desired nominal temperature Tn, the temperature regulating system may increase heat addition QC to the memory chip 304 by increasing power to a resistor R or via another heating clement. In instances where a given heating element most directly affects the cold memory chip 304, the temperature regulating system may increase heat addition QC using that specific heating element rather than for the whole memory blade 130 or memory array. The opposite may be performed when the sensor S indicates that the memory chip 304 exceeds the desired nominal temperature Tn.

Figure 3B:
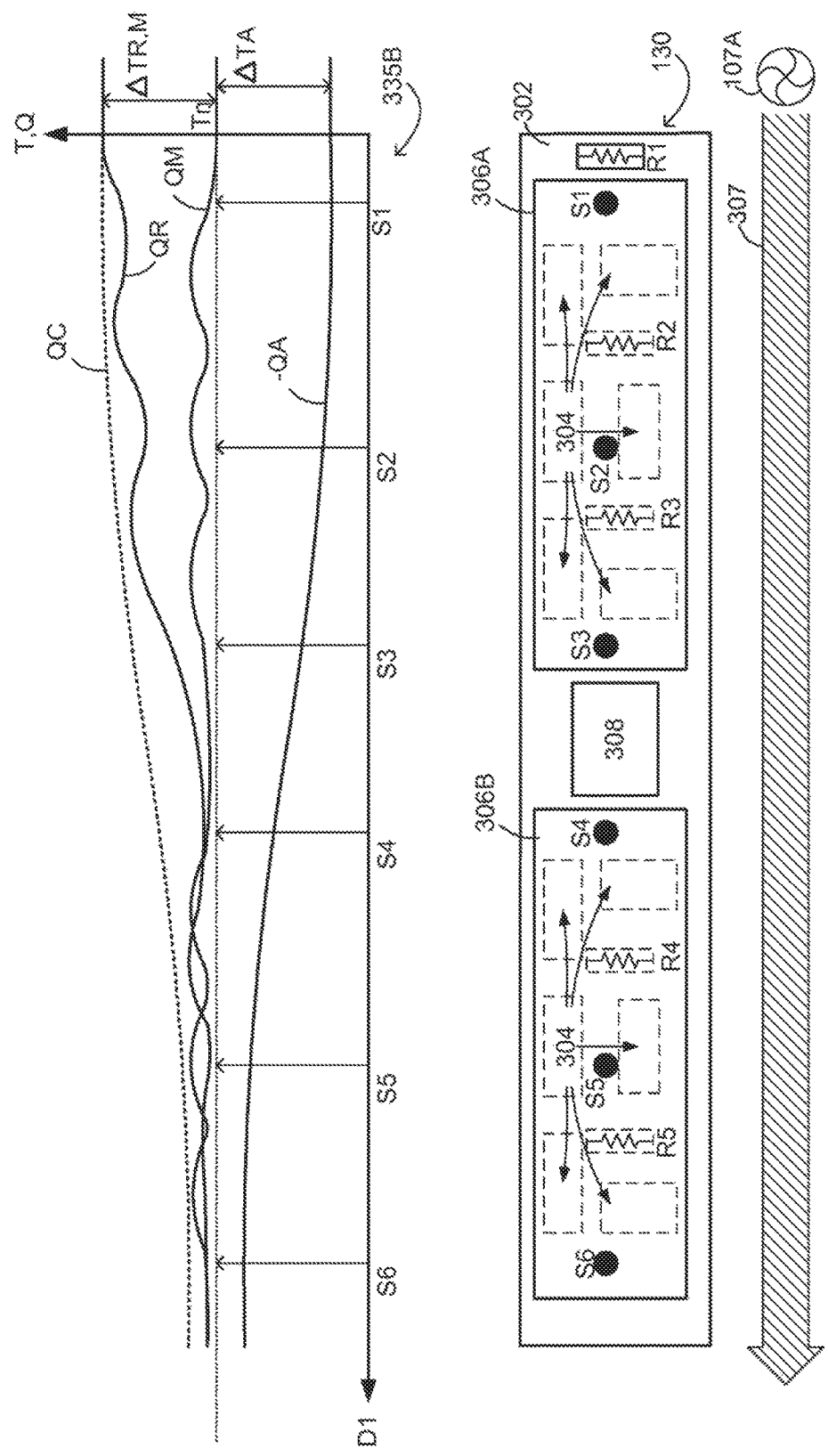

FIG. 3B illustrates a right-side view of a memory blade 130 within a thermal chamber 101 and thermal regulation thereof, according to one embodiment. As shown, the graph 335B illustrates the component parts of heat input QC into the memory chips 304. Specifically, for the embodiment of the memory blade 130 illustrated in FIG. 3B, the heat input QC includes the heat QR input by resistors R1-6 and the heat QM generated by the memory chips 304 themselves which causes an overall change in temperature $\Delta TR,M$. Other heat input QC components not shown may include the controller 308. Only one heat removal −QA component, airflow 307, is illustrated for simplicity.

Assuming all the memory chips 304 on the memory blade 130 are operating at the same level of activity, they should all generate a similar amount of heat QM. As the heat removal −QA due to the airflow 307 is greater at distances closer to the fan 107A, the memory chips 304 monitored by sensor S1 would typically run cooler than those monitored by sensor S2 and so on. To mitigate these differences, the temperature regulating system may increase resistive heat input QR by the resistors R until the sensors provide temperature readings at Tn.

The temperature regulating system may adjust the heat input of each resistor R individually and/or as logical groups such as by which heat spreader 306 a group of resistors R are coupled to. The latter may be beneficial for warm-up sequences and other scenarios requiring large increases/decreases of temperature as heat spreaders 306 mitigate large differences in temperature between the memory chips 304, resistors R and other components coupled thereto. Additionally, the temperature regulation system may address the resistors as groups (e.g., based on the heat spreader 306) to heat memory chips 304 within a lower bounds temperature range, e.g., −3° C. of Tn.

Finer adjustments may be made by addressing individual resistors proximate to temperature sensors S where a temperature change is desired. For example, if the temperature regulating system detects a low temperature at sensor S2, it may increase the temperature at sensor S2 up to Tn using bear input QR from proximate resistors R2 and R3. These finer local adjustments can account for differences in levels of activity between chips coupled to the same heat spreader 306 that may result in fluctuations outside the desired regulation range, e.g., +/−3° C. of Tn.

Additionally, in embodiments where a cooling element (e.g., fans 107A) cannot selectively cool a memory chip 304 or group of memory chips on a single memory blade 130, the temperature regulating system may run the fans 107A at a level such that some heat input QR is required from all resistors R to maintain the memory chips 304 at Tn. The temperature regulating system may operate in this manner due to the fast response time of the resistive heating elements R in producing a local temperate change at a specific memory chip 304 proximate to the heating element compared to that of the fans 107A. In turn, the temperature regulating system may quickly reduce/increase temperature of any given memory chips 304 by simply adjusting power to nearby resistors R. Only after power delivery to a resistor R is stopped and the memory chip 304 still runs hot would the fan 107A speed need to be increased.

Figure 4A:
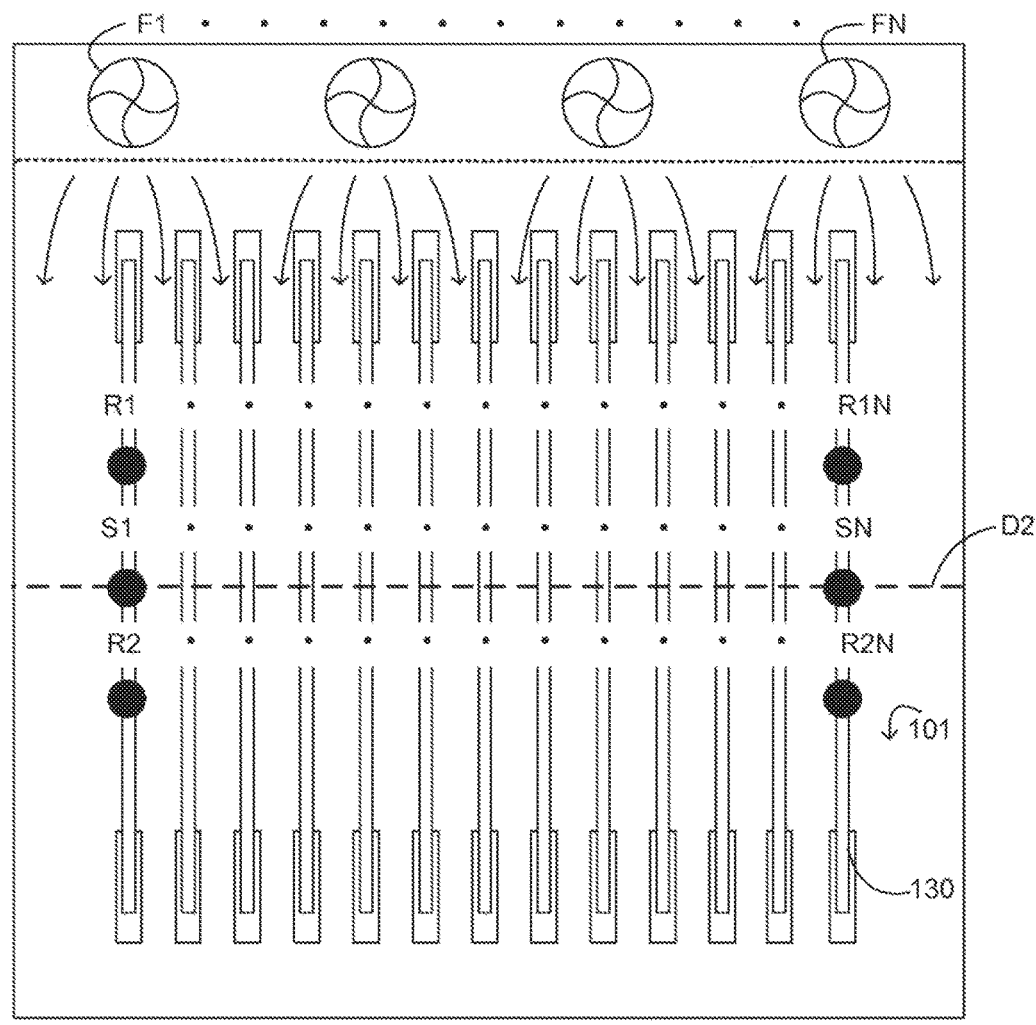
FIG. 4A-C illustrate a top-down view of memory blades within a thermal chamber and thermal regulation thereof, according to one embodiment.
Figure 4A:
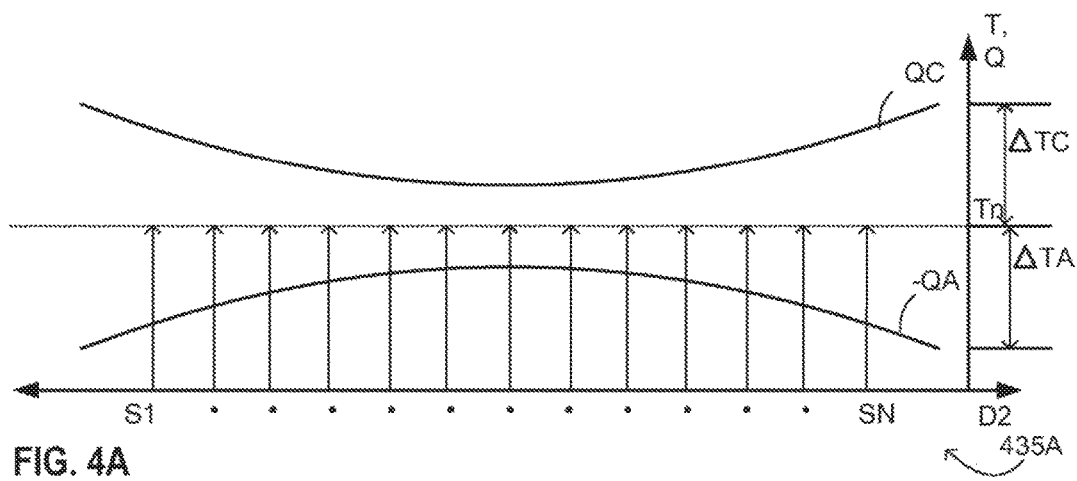

FIG. 4A illustrates a top-down view of memory blades 130 within a thermal chamber 101 and thermal regulation thereof, according to one embodiment. As shown, a number of fans F1-N generate airflow through the thermal chamber 101. In accordance with the embodiment illustrated in FIG. 3A, each memory blade 130 includes a sensor S monitoring the temperature of memory chips (not shown) on the memory blade and a number of resistors R proximate to the sensor. The sensors S1-N are aligned along the horizontal path D2 through the memory array. Graph 435A illustrates the sensor S1-N readings along path D2 at the desired nominal temperature Tn of the memory chips.

Graph 435A also illustrates the heat input QC by resistors R1-R1N and R2-R2N into the memory chips producing the corresponding sensor S readings. The heat input QC may also include heat generated by other components such as controller 308 and the memory chips themselves due to their activity. As described previously, the memory blades 130 at the edges of the array may run cooler than those in the middle region of the array due to the air flow through the middle region heating up faster. Accordingly, graph 435A illustrates that the heat removed −QA from memory chips at the center of the array may be less than the heat removed −QA at the edges of the array. To run the memory chips in the middle region of the array at Tn, the temperature regulating system must run the fans F1-N, at minimum, at a speed that such that all sensors S report a temperature less than or equal to Tn when resistors R are inactive.

In turn, to counteract the over cooling of memory chips (e.g., those at the edges of the array), the temperature regulating system activates the resistors R based on the corresponding sensor S feedback to input heat QC and balance heat removed −QA by the air to maintain the memory chips at the desired operating temperature Tn. For example, if sensor S1 reports a temperature below Tn for a memory chip, resistors R1 and R2 may be activated to heat the memory chip to temperature Tn.

Figure 4B:
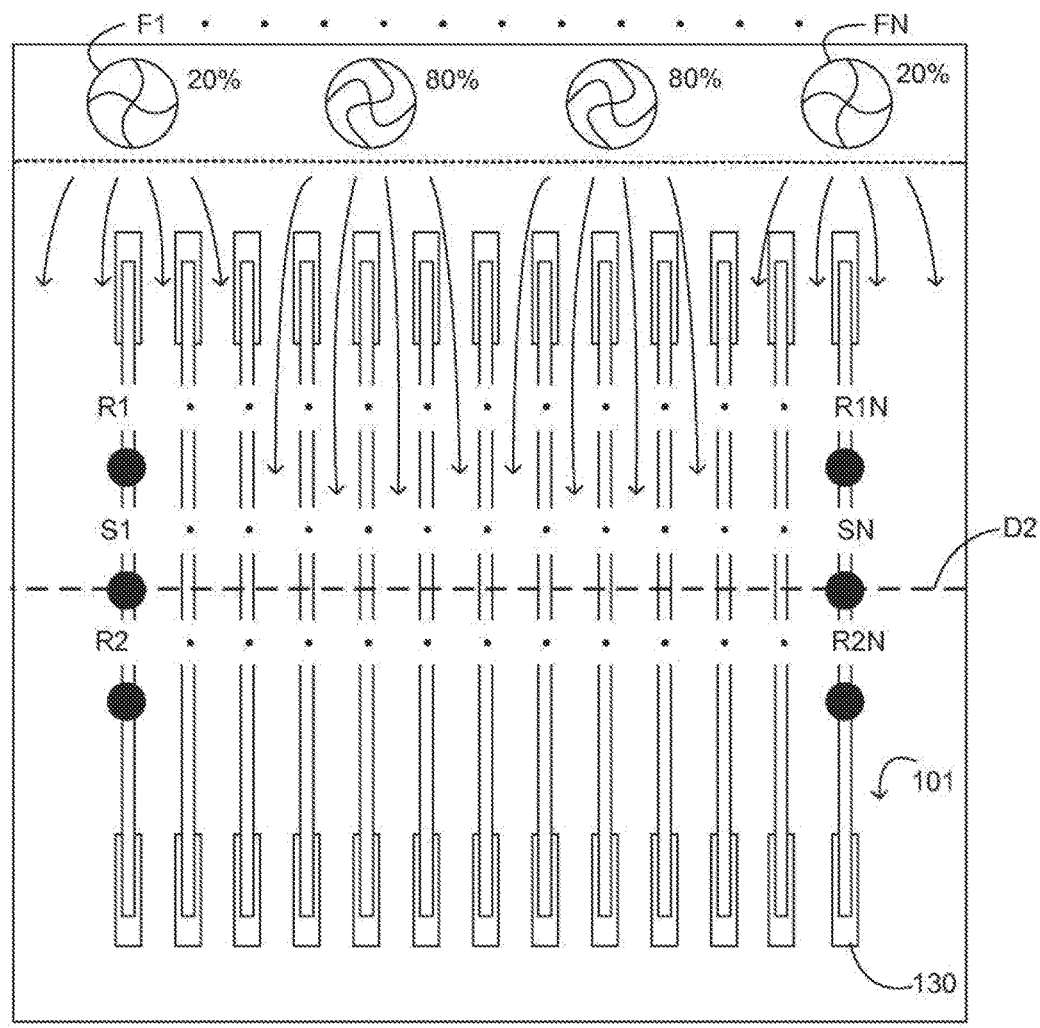
Figure 4B:
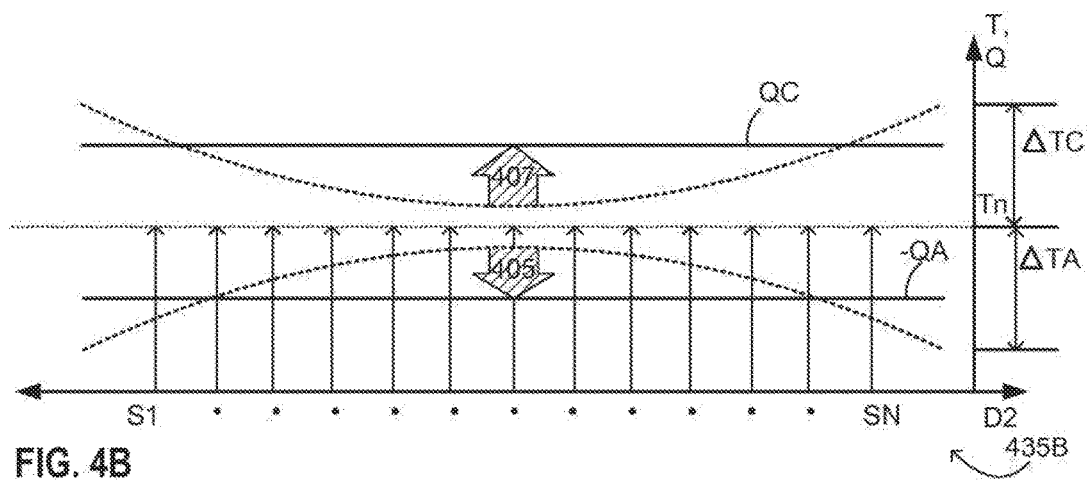

FIG. 4B illustrates a top-down view of memory blades 130 within a thermal chamber 101 and thermal regulation thereof, according to one embodiment. As shown, a number of fans F1-N generate airflow through the thermal chamber 101. In accordance with the embedment illustrated in FIG. 3A, each memory blade 130 includes a sensor S monitoring the temperature of proximate memory chips (not shown) on the memory blade and a number of resistors R proximate to the sensor. The sensors S1-N are aligned along the horizontal path D2 through the memory array. Graph 435B illustrates the sensor S1-N readings along path D2 at the desired nominal temperature Tn of the memory chips.

In some embodiments, the temperature regulating system may adjust the speed of specific fans F1-N to regulate cooling of different regions within the memory array. For example, the temperature regulating system may decrease the speed of fans cooling the edges of the array (e.g., by 20%) while increasing the speed of fans cooling 405 the middle region of the array (e.g., by 80%) to achieve more even heat removal −QA from the array. As shown in graph 435B, the selective adjustment of fans F1-N to regulate cooling due to fair flow through path D2 increases 405 the heat removed −QA from the middle of the array. Consequently, heat input QC from resistors R within the middle region of the array is increased 407 to counteract the additional cooling. Additionally, as the fans at the edges of the array may be reduced to decrease the amount of heat removal at the edges of the array, the temperature regulating system may decrease power to the resistors R heating those memory chips. Overall, the temperature regulating system may adjust the heat input QC and heat removal −QA such that the maintaining of the nominal temperature Tn is balanced between both resistors R and fans F.

In some embodiments, the temperature regulating system may set a threshold for fan speed under normal operating conditions to prevent premature wear of the fans. For example, fans F1-N may be limited to 80 percent of their maximum speed and, in instances where fan speed would need to be increased past 80% to remove heat −QA to regulate memory chip temperature to Tn, power to the resistors R may be reduced instead.

In some embodiments, the temperature regulating system may set a threshold for power delivered to resistors R under normal operating conditions to prevent their failure. For example, resistors R may be limited to 5 Watts power and, in instances where delivered power would need to be increased over 5 Watts to input heat QC to regulate memory chip temperature to Tn, the speed of corresponding fans (e.g., fan F1 for resistor R1) may be decreased. The temperature regulating system ideally operates both fans F and resistors R within their ideal operating range while maintaining the memory chips are the desired operating temperature Tn.

Additionally, the temperature regulating system may provide fault tolerance, for example, if fan F1 fails, the controller may increase the speed of adjacent fans to compensate. Although this may result in an uneven airflow through the thermal chamber 101, the temperature regulating system can adjust power delivery to resistors, e.g., R1 and R2, in the affected region to reduce the airflow required to maintain the memory chips in the region with the range for Tn.

Furthermore, the temperature regulating system may sense disparities (e.g., in speed) between the different fans within a thermal chamber 101 to estimate a failure point. For example, if the temperate regulating system delivers 5 Watts to each fan and one fan reports a speed (e.g., in rotations per minute) below that of its peers, the fan's lifetime may be shorter. When the temperature regulating system detects such a disparity, power deliver to the other fans may be increased (e.g. by 0.5 Watts) to compensate for the fan with the reduced lifetime. In turn, power delivery to the fan with the shorter estimated lifetime may be reduced by 0.5 Watts.

Figure 4C:
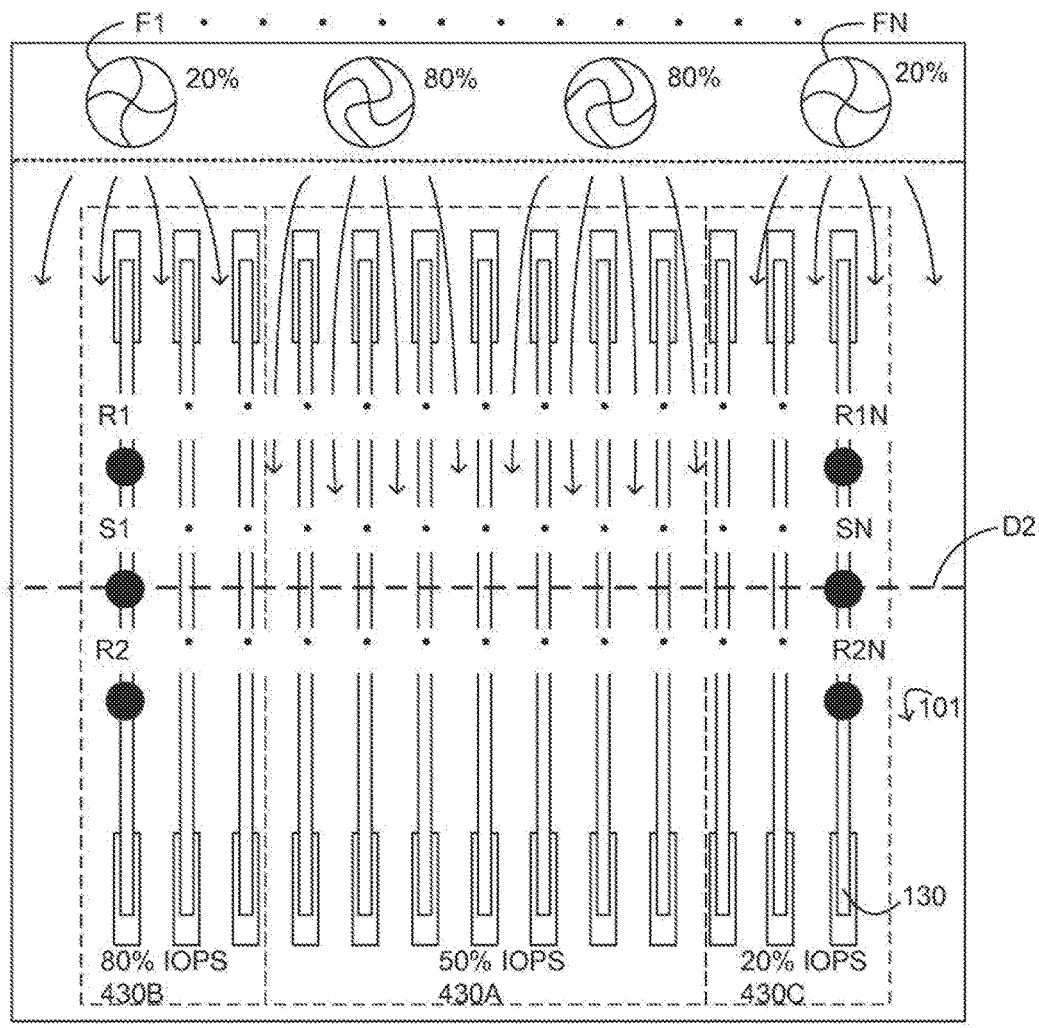
Figure 4C:
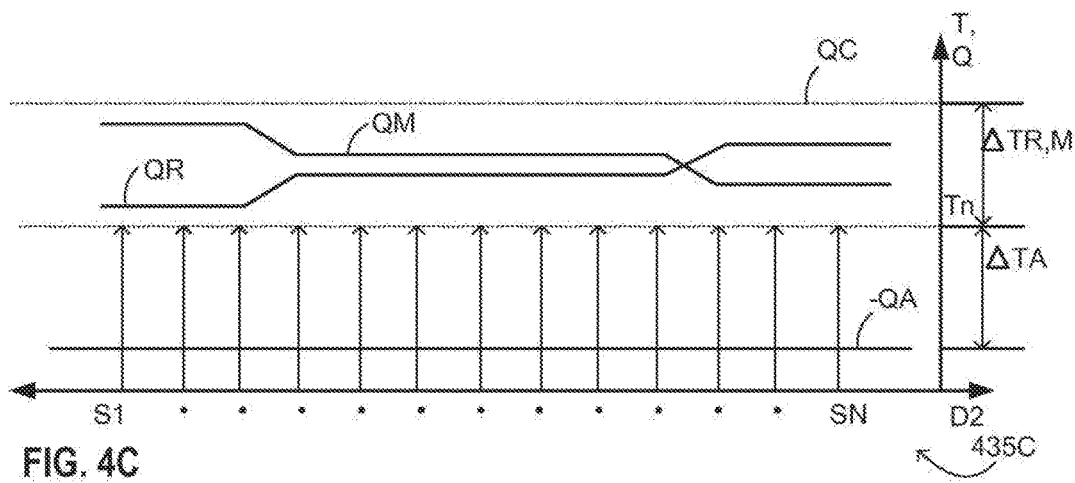

FIG. 4C illustrates a top-down view of memory blades 130 within a thermal chamber 101 and thermal regulation thereof, according to one embodiment. As described previously, varying levels of activity among memory blades 130 and the memory chips thereon result in temperature difference among memory chips. FIG. 4C illustrates three groups of memory blades 430A, 430B, 430C having differing levels of activity, or IOPS. As the number of Input/Output Operations Per Second (IOPS) performed by a memory chip increases, the memory chip generates additional heat QM. FIG. 4C illustrates memory blades 430A operating at 50 percent of their maximum IOPS, memory blades 430B at 80% IOPS and memory blades 430C at 20% for a given time period (e.g., on the order of seconds to hours). While the memory blades 130, and memory chip, activity levels are oftentimes independent, the groupings of memory blades 430A, 430B, 430C are shown for illustrative purposes.

Graph 435C illustrates example temperature reading from sensors S1-N measuring the temperature of memory chips along a horizontal path D2 perpendicular to the respective memory blades 130. The change in temperature ΔTA due to heat removal −QA is held constant for case of explanation. The temperature regulating system adjusts the heat input QC to counteract the heat removed −QA to regulate the temperature of the memory chips to their nominal operating temperature Tn. The input heat QC may include heat input QR from the resistors R1-R1N, R2-R2N proximate to the sensors S1-N, respectively, and the heat generated QM by the corresponding memory chips themselves.

As the IOPS decrease from left to right along path D2, the heat generated QM by the memory chips decreases and may result in a negative change in temperature ΔTR,M (for constant −QA). The sensors S1-N monitoring the temperature of the memory chips sense when corresponding heating elements R1-R1N and/or R2-R2N should input heat QR to maintain the memory chips within the desired regulation range, e.g., +/−3° C. of Tn. For example, if a given sensor, e.g., SN, reports a memory chip temperature under the regulation range of Tn, the temperature regulating system increases the power to the corresponding resistor(s) R1N and/or R2N to input more heat QR to counteract the change in temperature ΔTR,F.

Conversely, if the IOPS increase, the heat generated QM by the memory chips increases and may result in a positive change in temperature ΔTR,M (for constant −QA). Thus, if a given sensor, e.g., S1, reports a memory chip temperature over the regulation range of Tn, the temperature regulating system decreases the power to the corresponding resistors) R1 and/or R2 to counteract the change in temperature ΔTR,M (for constant −QA) by reducing heat input QR.

In practice, as described above, the temperature regulation system manages both heating elements and cooling elements in a thermal chamber housing memory chips. The temperature regulation system adjusts the elements to mitigate temperature discrepancies among memory chips that arise during operation of the storage system. For example, the temperature regulation system may manage the various heating elements and cooling elements to tightly regulate the temperature of memory chips mounted on memory blades in an array within a desired regulation range, e.g., +/−3° C., of the desired nominal operating temperature of the memory chips.

In some embodiments, the desired nominal temperature changes throughout the lifetime of the memory chips and/or based on the operations being performed by the memory chips. In turn, based on the operation being performed, the temperature regulating system may set a particular nominal operating temperature for the memory chips. The temperature regulating system may further adjust the nominal operating temperature to compensate for a current lifetime factor of the memory and may be adjusted differently for different memory blades or chips. The lifetime factor describes changes in optimal memory operating temperature to adjust for past operational history such as age (e.g., total runtime) and/or total cycles (e.g., number of read/write operations). The lifetime factor may also describe changes based on a test pattern result describing current health (e.g., charge storage ability, read current, read errors, etc.) of the memory.

The temperature regulating system may distinguish between different operating conditions of the memory chips or blades by interfacing with a memory controller 308 or other digital component, and/or by maintaining its own database. In turn, the temperature regulation system may determine a lifetime adjustment factor for the nominal operating temperature based on the operational history or test pattern results for memory chips or blades. Alternatively, the temperature regulation system may access a preconfigured table storing lifetime adjustment factors for different history or test pattern results.

Table 1 illustrates example temperature regulation functions performed by the temperature regulation system for example operating conditions:

TABLE 1

| Chamber | Type | Regulation Function | Operating Condition |
|---|---|---|---|
| Digital | Absolute | Tj < TjMax | Maintain Junction Temperature below Maximum Value |

TABLE 1-continued

| Chamber | Type | Regulation Function | Operating Condition |
|---|---|---|---|
| PSU | Absolute | Tpsu < TpsuMax | Maintain Power Supply Temperature below Maximum Value |
| Memory | Range | TnLow < Tn < TnHigh | Set Range for Nominal Temperature, e.g., Tn +/−3° C. |
| Memory | Value | Tn = TWrite | Set Tn to Nominal Write Temp, e.g., 70° C. |
| Memory | Value | Tn = TRead | Set Tn to Nominal Read Temp, e.g., 25° C. |
| Memory | Value | Tn = TIdle | Set Tn to Nominal Idle Temp, e.g., 35° C. |
| Memory | Range | TnALow < TnA < TnAHigh | Set Range for a Lifetime Adjusted Nominal Temperature, e.g., TnA +/−3° C. |
| Memory | Value | TnA = Lifetime(Tn) | Adjust Tn based on Memory Lifetime |

In addition to setting the nominal temperature Tn (and adjusted nominal temperature TnA) for the thermal chamber containing the memory, the temperature regulating system may specify different nominal temperatures for different regions of the thermal chamber, different memory blades within the thermal chamber, different groups of memory chips on a memory blade, and/or different individual memory chips on a memory blade. Accordingly, depending on the desired resolution, the temperature regulating system may address groups of heating-cooling elements affecting multiple memory chips or blades to individual elements associated with memory chips. In order to regulate temperature as described above, the temperature regulating system may include the example temperature regulation logic described below with reference to FIG. 5 for selecting and maintaining desired nominal temperatures.

Figure 5:
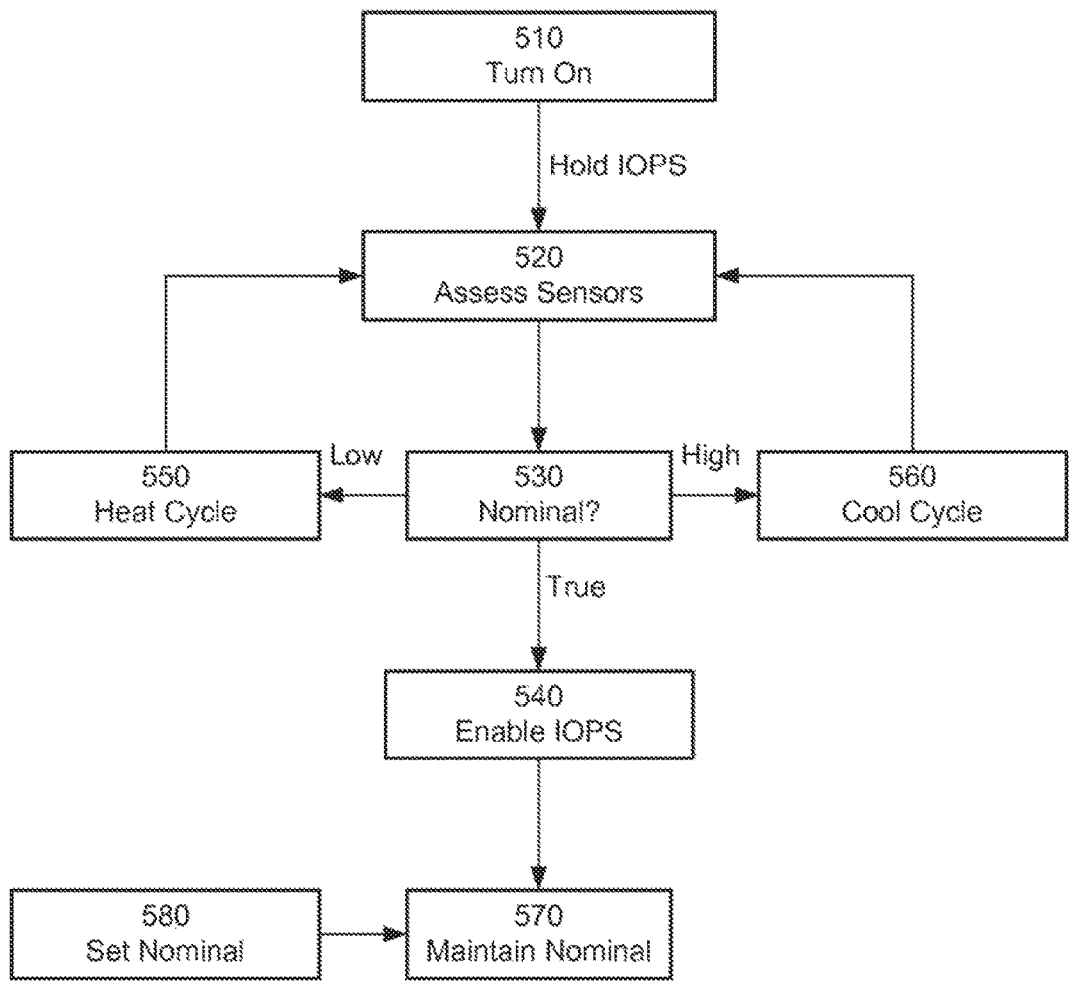
FIG. 5 is a flowchart detailing an example regulation process performed by a temperature regulating system of a storage system, according to one embodiment.

FIG. 5 is a flowchart detailing an example regulation process performed by a temperature regulating system of a storage system, according to one embodiment. By operating the memory chips at the nominal temperature total operational lifetime measured, for example, in total number of read/write operations before failure may be increased. The temperature regulation system may also mange the cooling elements within other thermal chambers such as a digital chamber and power supply chamber.

Initially, when the storage system turns on 510. the temperature regulation system may not be fully initialized and active. Typically, the turn on 510 start up sequence involves running cooling elements, such as fans, at their maximum speed in case of a high ambient temperature or restart subsequent to a thermal shutdown or other system fault. To protect the memory chips from premature wear before heating up or cooling down to the desired nominal temperature, the temperature regulating system may hold unnecessary (or all) memory input/output operations. As operations of the memory chips are minimized or halted, the temperature regulating system may prevent cooling of the thermal chamber housing the memory chips. Forgoing initial cooling of the thermal chamber housing the memory may shorten a likely heating cycle.

The temperature regulating system subsequently assesses 520 temperature sensors to determine whether reported temperatures are within a nominal 530 range. For example, sensors in the digital chamber may be assessed 520 to ensure no components exceed their maximum junction temperature TjMax. Similarly, sensors in the power supply chamber may be assessed 520 to ensure the power supply does not exceed its maximum operating temperature TpsuMax.

In the thermal chamber housing memory chips, the temperature regulating system assesses 520 temperature sensors providing readings for the memory chips. The reported temperatures are compared to a desired nominal temperature set for the memory chips. For example, the reported temperatures may be compared to a desired idle temperature (or other specific startup temperature) for the memory chips.

If sensed temperatures fall below the desired range of the nominal temperature, a heating cycle 550 is activated. For example, the temperature regulating system may activate heating elements that affect memory cells monitored by sensors falling below the temperature range. The thermal regulating system continues to access 520 the sensors until they report memory temperatures within the desired nominal temperature range. If sensed temperatures exceed the desired range of the nominal temperature, a cooling cycle 560 is activated. For example, the temperature regulating system may activate cooling elements that affect memory cells monitored by sensors exceeding the temperature range. The thermal regulating system continues to access 520 the sensors until they report memory temperatures within the desired nominal temperature range.

Depending on the embodiment, the temperature regulating system may perform steps 520, 530 based on individual sensor readings, readings from collections of sensors (e.g., on a memory blade), or for all sensors in the memory chamber until the nominal temperature 530 of the memory is achieved. In determining the temperature of a memory chip, memory blade, thermal chamber, etc., readings from one or more sensors may be averaged over an interval (e.g., a sliding window), or examined for a given time period to observe changes in temperature. Embodiments of the temperature regulating system may be location-aware of sensor placement and measurement medium (e.g., ambient air, direct contact, coupled, etc.) of a sensor or collection of sensors and adjust the elements used in heating 550 and cooling 560 cycles accordingly. Additionally, in embodiments where individual heating/cooling elements (e.g., a resistive heating clement R or fan) and/or collections of like elements are controlled by the temperature regulating system, the heating 550 and cooling 560 cycles can both occur at the same time. For example, if one sensor reports a high temperature and another is low, cooling elements and heating elements corresponding to (i.e., effective in heating-cooling memory chips proximate to) the respective sensors, may be active at the same time.

In one embodiment, in order to quickly heat the memory chips during the startup phase, the temperature regulating system may begin applying a minimal amount of cooling once a sensor hits the low bounds of the temperature regulation range. Only when the sensor hits the upper bounds of the temperature regulation will heat input proximate to the sensor be reduced or cooling increased. Once all sensors report temperatures above the lower bounds of the desired temperature regulation range, the temperature regulating system enables 540 the memory chips to perform input/output operations.

While the memory chips perform operations, the temperature regulating system maintains 570 the memory chips at nominal temperature using the heating elements and the cooling elements at its disposal. Additionally, with the memory chips active during the maintain 570 step, the temperature regulating system may throttle (e.g., decrease or hold) memory chips IOPS to mitigate temperature increases. For example, the temperature regulating system may throttle activity of a memory chip, or collection thereof (e.g., on a blade), while the temperature regulating system reacts to an increase in temperature. Alternatively, the temperature regulating system may allow an increase in memory chip IOPS to mitigate temperature decreases. For example, the temperature regulating system may redirect write activity to a particular memory chip decreasing in temperature.

In some embodiments, the temperature regulating system monitors the operating conditions of groups of memory chips and/or individual memory chips. As the operating conditions of a memory chips changes, the desired nominal operating temperature may also change. In turn, the temperature regulating system determines and sets 580 the nominal temperature and range the memory chip should be maintained within. For example, the temperature regulating system may set 580 the nominal temperature and range based on whether the memory chip is predominately performing reads or writes, age, or health of the memory. The temperature regulating system maintains 570 the memory chip at the adjusted nominal temperature range to maximize memory chip lifetime.

For example, as described above, the temperature regulating system may maintain 570 a memory chip or collections of memory chips at their desired nominal temperatures by performing steps 520, 530 based on individual sensors proximate to the memory chip, collections of sensors (e.g., corresponding to the memory chips on a memory blade), or for all sensors in the memory chamber. Additionally, in embodiments where individual heating/cooling elements (e.g., a resistive heating element R or fan) and/or collections of like elements are controlled by the temperature regulating system, the heating 550 and cooling 560 cycles can both occur at the same time. For example, if one sensor reports a high temperature for a memory chips and another is low for a different memory chips, the temperature regulating system may activate the cooling elements and heating elements corresponding to (i.e., effective in heating/cooling memory chips proximate to) the respective sensors in order to maintain 570 the memory chips within their set 580 nominal temperatures.

Additionally, the temperature regulating system may prioritize the use of different heating or cooling elements to maintain 570 a memory chip or collections of memory chips at their desired nominal temperatures. To heat a particular memory chip, for example, the quickest method may be to activate proximate heating elements (e.g., resistive heaters). Similarly, to cool a particular memory chip, a local cooling element (not shown) may be activated and/or heat input from nearby heating elements decreased. To heat a collection of memory chips, such as on a memory blade, a combination of resistive heaters and decrease in air flow from a particular fan cooling the memory blade may be used. Similarly, to cool a collection of memory chips, a combination of decrease in power to resistive heaters and increase in air flow from a particular fan cooling the memory blade may be used. In embodiments where memory blades include local cooling elements, the local cooling elements may be activated in addition to, or instead of the fans to cool a memory chip or memory blade.

Embodiments of the present invention are not limited to the specific hardware elements used to create the chassis 100 in the example embodiments described above. For example, in alternative embodiments, the fans may be placed outside of their respective thermal chambers (e.g., on the exterior of the chassis). Alternatively, different components or systems may be used in conjunction with or in place of the fans to perform the cooling and temperature regulating functions of the chassis 100 (e.g., heat pipes, liquid cooling systems, etc.). The thermal chambers can also be implemented in a chassis with a form factor that is different from the 1U rack mount form factor described herein (e.g., a tower, a desktop, an all-in-one, or a rack-mount chassis spanning multiple rack units). In addition, the underlying principles described herein may be applied to various other hardware components, including those not presently available.

In some specific alternative embodiments, the temperature regulating system may be incorporated in consumer storage devices such as a solid state chive in a 1.5", 2.5", 3.5" form factor, portable storage device such as a USB key or drive, and/or plug-and-play consumer system bus devices such as a Peripheral Component Interconnect Express (PCIe) compatible storage drive. Such devices may include a variety of their own dedicated cooling elements, which may be passive (e.g., heat spreaders and pipes) or active (e.g., internal or externally coupled fan), and/or receive cooling from system components external to the device itself (e.g., system fan). Heating elements and temperature sensors, however, are typically configured as detailed herein—coupled with memory chips via heat spreader, thermal vias, or directly.

The temperature regulating system in the consumer device may regulate memory temperature similar to the configurations described herein, however certain features and abilities may be removed or reduced based on the heating and cooling elements available for maintaining nominal temperate of memory devices within the consumer storage device.

An additional ability of relevance to consumer devices where device endurance and reliability may trump data transfer rate includes monitoring of IOPS. The temperature regulating system may monitor and increase/decrease the number of IOPS (assuming the maximum device data rate is not limited by the transfer protocol and vice versa) to regulate memory chip temperature.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

The invention claimed is:

1. A storage system comprising:
   a memory chamber comprising a plurality of memory devices configured to store data;
   a plurality of temperature sensors thermally coupled to the plurality of memory devices;
   a first cooling system configured to remove heat from the memory chamber;
   a heating system comprising a plurality of heating elements; and
   a temperature regulating system configured to cause the first cooling system to remove heat from the memory chamber, to cause a first one of the plurality of heating elements to provide a first amount of heat to a first subset of the plurality of memory devices, and to cause a second one of the plurality of heating elements to provide a second amount of heat to a second subset of the plurality of memory devices, thereby maintaining a temperature of the plurality of memory devices within a first predetermined range, wherein the first cooling system is configured to remove heat from the first subset of the plurality of memory devices at the same time as the first one of the plurality of heating elements providing the first amount of heat to the first subset of the plurality of memory devices.

2. The storage system of claim 1, wherein the plurality of memory devices is disposed on a plurality of memory blades arranged as an array in the memory chamber.

3. The storage system of claim 2, wherein the temperature regulating system is configured to cause the first cooling system to remove more heat from a middle of the array than an edge of the array.

4. The storage system of claim 2, wherein one of the plurality of memory blades comprises a heat spreader coupled to a third subset of plurality of memory devices and a third one of the plurality of heating elements, and wherein the third one of the plurality of heating elements is configured to provide heat to the third subset of plurality of memory devices through the heat spreader.

5. The storage system of claim 2, wherein one of the plurality of memory blades comprises a thermal layer coupled to a third subset of plurality of memory devices and a third one of the plurality of heating elements, and wherein the third one of the plurality of heating elements is configured to provide heat to the third subset of plurality of memory devices through the thermal layer.

6. The storage system of claim 1, wherein the first cooling system comprises a plurality of cooling elements, and wherein the temperature regulating system is configured to estimate a lifetime of a first one of the plurality of cooling elements based on a performance disparity between the first one of the plurality of cooling elements and a second one of the plurality of cooling elements.

7. The storage system of claim 1, further comprising a digital chamber including electronic components, wherein the digital chamber is coupled to a second cooling system configured to remove heat from the digital chamber, and the temperature regulating system is configured to regulate a temperature of the components within a second predetermined range.

8. The storage system of claim 1, wherein the temperature regulating system is configured to determine the first predetermined range based in part on an operating condition of the plurality of memory devices.

9. The storage system of claim 1, wherein the temperature regulating system is configured to modify an activity level of the first subset of the plurality of memory devices to regulate a temperature of the first subset of the plurality of memory devices.

10. The storage system of claim 1, wherein the first subset of the plurality of memory devices comprises a single memory device.

11. The storage system of claim 1, wherein the temperature regulating system is configured to cause the first one and the second one of the plurality of heating elements to provide the first amount of heat and the second amount of heat, respectively, based, at least in part, on information from at least one of the plurality of temperature sensors.

12. A method of regulating temperature in a storage system, the method comprising:
   removing heat, by a first cooling system, from a memory chamber comprising a plurality of memory devices configured to store data;
   providing, by a first heating element in a heating system, a first amount of heat to a first subset of the plurality of memory devices, at the same time as removing heat, by the first cooling system, from the first subset of the plurality of memory devices;
   providing, by a second heating element in the heating system, a second amount of heat to a second subset of the plurality of memory devices, thereby maintaining a temperature of the plurality of memory devices within a first predetermined range.

13. The method of claim 12, wherein providing the first amount of heat and the second amount of heat comprises providing the first amount of heat and the second amount of heat based, at least in part, on information from a temperature sensor.

14. The method of claim 12, wherein the plurality of memory devices is disposed on a plurality of memory blades arranged as an array in the memory chamber, and the method further comprises removing more heat from a middle of the array than an edge of the array.

15. The method of claim 14, wherein one of the plurality of memory blades comprises a heat spreader coupled to a third subset of plurality of memory devices and a third one of the plurality of heating elements, and the method comprises providing heat, by the third one of the plurality of heating elements, to the third subset of plurality of memory devices through the heat spreader.

16. The method of claim 14, wherein one of the plurality of memory blades comprises a thermal layer coupled to a third subset of plurality of memory devices and a third one of the plurality of heating elements, and the method comprises providing heat, by the third one of the plurality of heating elements, to the third subset of plurality of memory devices through the thermal layer.

17. The method of claim 12, further comprising determining the first predetermined range based in part on an operating condition of the plurality of memory devices.

18. The method of claim 12, further comprising modifying an activity level of the first subset of the plurality of memory devices to regulate a temperature of the first subset of the plurality of memory devices.

19. The method of claim 12, wherein the first subset of the plurality of memory devices comprises a single memory device.

20. The method of claim 12, further comprising regulating a temperature of components within a digital chamber to a second predetermined range by causing a second cooling system coupled to the digital chamber to remove heat from the digital chamber.

* * * * *